United States Patent
Daleiden

(10) Patent No.: US 10,654,325 B2
(45) Date of Patent: May 19, 2020

(54) FORAGE COMPACTOR

(71) Applicant: Agromatic Incorporated, Fond du Lac, WI (US)

(72) Inventor: Kevin L. Daleiden, Van Dyne, WI (US)

(73) Assignee: Agromatic Incorporated, Fond du Lac, WI (US)

( * ) Notice: Subject to any disclaimer, the term of this patent is extended or adjusted under 35 U.S.C. 154(b) by 642 days.

(21) Appl. No.: 14/630,538

(22) Filed: Feb. 24, 2015

(65) Prior Publication Data

US 2015/0266252 A1    Sep. 24, 2015

Related U.S. Application Data

(60) Provisional application No. 61/968,992, filed on Mar. 21, 2014.

(51) Int. Cl.
| | | |
|---|---|---|
| *B30B 3/00* | (2006.01) | |
| *A01F 25/18* | (2006.01) | |
| *B60D 1/07* | (2006.01) | |
| *A01F 25/16* | (2006.01) | |

(52) U.S. Cl.
CPC ............ *B60D 1/075* (2013.01); *A01F 25/166* (2013.01); *A01F 25/183* (2013.01); *B30B 3/005* (2013.01)

(58) Field of Classification Search
CPC . B30B 3/00; B30B 3/005; B65B 27/12; A01F 15/10; A01F 17/02; A01F 25/166; A01F 25/183; B60D 1/075
USPC ................................................ 100/65, 155 R
See application file for complete search history.

(56) References Cited

U.S. PATENT DOCUMENTS

| | | |
|---|---|---|
| 1,171,783 A | 2/1916 | Gray |
| 1,217,957 A | 3/1917 | Keys |
| 1,624,734 A | 4/1927 | Hunt |
| 2,171,098 A | 8/1939 | Ragland, Sr. et al. |
| 2,437,524 A | 3/1948 | Harrison et al. |
| 3,332,661 A * | 7/1967 | Hand .................... B65D 90/14 254/423 |

(Continued)

FOREIGN PATENT DOCUMENTS

PL         66541 Y1 *  5/2013

OTHER PUBLICATIONS

Leszcynski (PL 66541 Y1) forage compactor—original with translation.*
Prior Art Figures (PAF)—14 630 538 Forage Compactor, Mar. 27, 2018.*
Circle definition—Google Search Jan. 7, 2019.*
Wheel definition—Google Search Jan. 7, 2019.*

(Continued)

*Primary Examiner* — Jimmy T Nguyen
(74) *Attorney, Agent, or Firm* — Brannen Law Office, LLC

(57) ABSTRACT

A forage compactor is provided having a frame that has cross bars supporting risers that in turn support a shaft. At least one asymmetric wheel is supported by the shaft. The wheels can be paired whereby journals are used to connect to the shaft between recesses of respective wheels. Each wheel has a first side and a second side, each with radiused portions that turn forage away from the wheel. The wheels have a band that is flush with the outer portion of the wheel sides to prevent lifting of the forage. A storage assembly is provided and is integrated into the framework. The storage assembly can be stored within the frame when the compactor is in use, and can be deployed to a locked position in order to store the compactor. A hitch framework is provided that can attach to multiple categories of three point hitches.

12 Claims, 20 Drawing Sheets

(56) References Cited

U.S. PATENT DOCUMENTS

| | | | | |
|---|---|---|---|---|
| 3,448,998 | A | * | 6/1969 | Abolins .................... B60S 9/02 |
| | | | | 254/419 |
| 3,595,411 | A | | 7/1971 | Ables |
| 3,881,409 | A | | 5/1975 | Frigieri |
| 4,284,293 | A | * | 8/1981 | Rygajlo .................... B60S 9/08 |
| | | | | 248/354.2 |
| 4,723,870 | A | * | 2/1988 | Martinez ................ E02D 3/026 |
| | | | | 301/128 |
| D337,365 | S | * | 7/1993 | Gertler ......................... D21/764 |
| 5,941,352 | A | * | 8/1999 | Lee .......................... A45C 5/14 |
| | | | | 190/11 |
| 6,149,180 | A | | 11/2000 | Haws |
| 6,213,491 | B1 | * | 4/2001 | Southard, Jr. ............ B60D 1/66 |
| | | | | 254/420 |
| 6,971,465 | B1 | | 12/2005 | Veara |
| 7,387,065 | B2 | | 6/2008 | Altenbuchner |
| 8,555,995 | B2 | | 10/2013 | Harris |
| 8,783,716 | B1 | * | 7/2014 | Pequignot ................. B60S 9/04 |
| | | | | 280/763.1 |
| 2002/0048489 | A1 | | 4/2002 | Caron et al. |
| 2013/0075456 | A1 | | 3/2013 | Hinrichsen et al. |

OTHER PUBLICATIONS

Bradco, Bradco Adapter Plate / 3 point hitch to skidsteer universal hitch, Model 87640, as viewed at http://www.everythingattachments.com/Universal-Skid-Steer-Quick-Attach-to-3-Point-Hitch-p/br-3pt-ssu.htm on Mar. 20, 2014. 4 pages.

Pat's Premium 3-Point Quick Change Hitch—Category 2, as viewed at http://www.northerntool.com/shop/tools/product_200280824_200280824 on Mar. 20, 2014. 2 pages.

category 1, 3 point hitch to skidsteer attachments, as viewed at http://www.hayspear.com/product/QA_CAT1_3PT_TO_SS/QA_CAT1_3PT_TO_SS.html on Mar. 20, 2014. 2 pages.

3-Point Hitch Adapters, as viewed at http://www.northerntool.com/shop/tools/category_farm-acreage+3point-pto-hardware+3-point-hitch-adapters on Mar. 20, 2014. 3 pages.

Talet Attachments International. Universal / 3-Point Hitch Adapter, as viewed at http://www.taletattachments.com/universaladapter on Mar. 20, 2014. 1 page.

Jako. Item 290538 Silage Spreader, as viewed at http://www.tractors-and-machinery.com/site_display_content.php?xpage=display_item&item=290538 on Mar. 19, 2014. 2 pages.

* cited by examiner

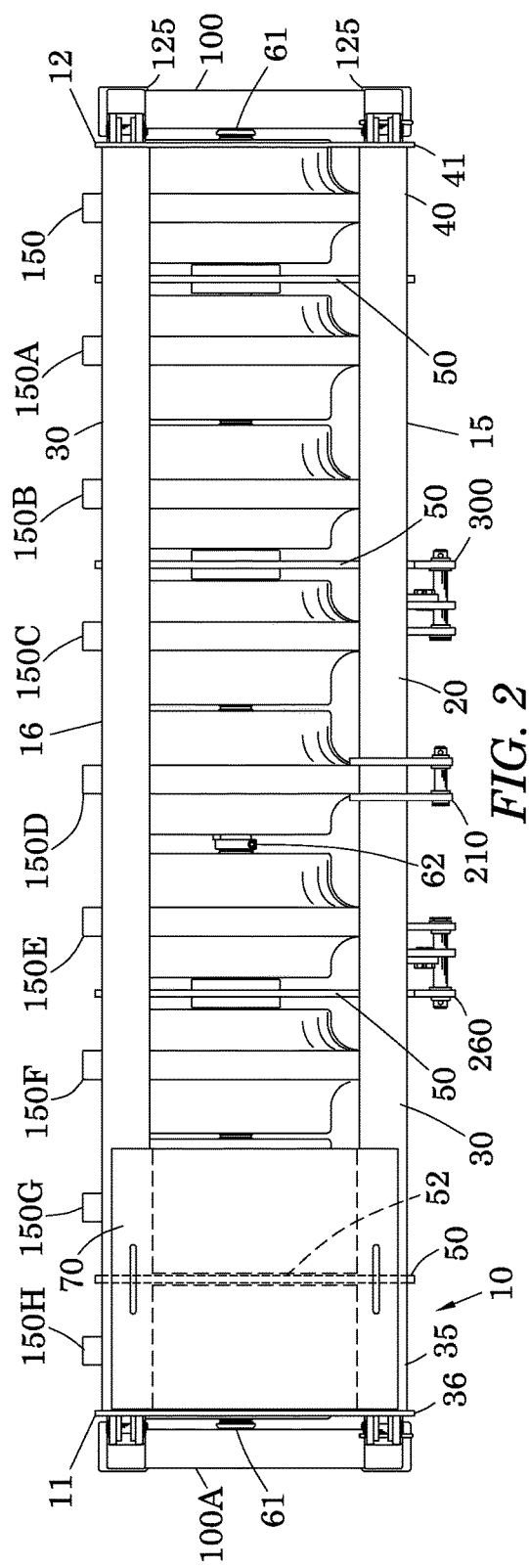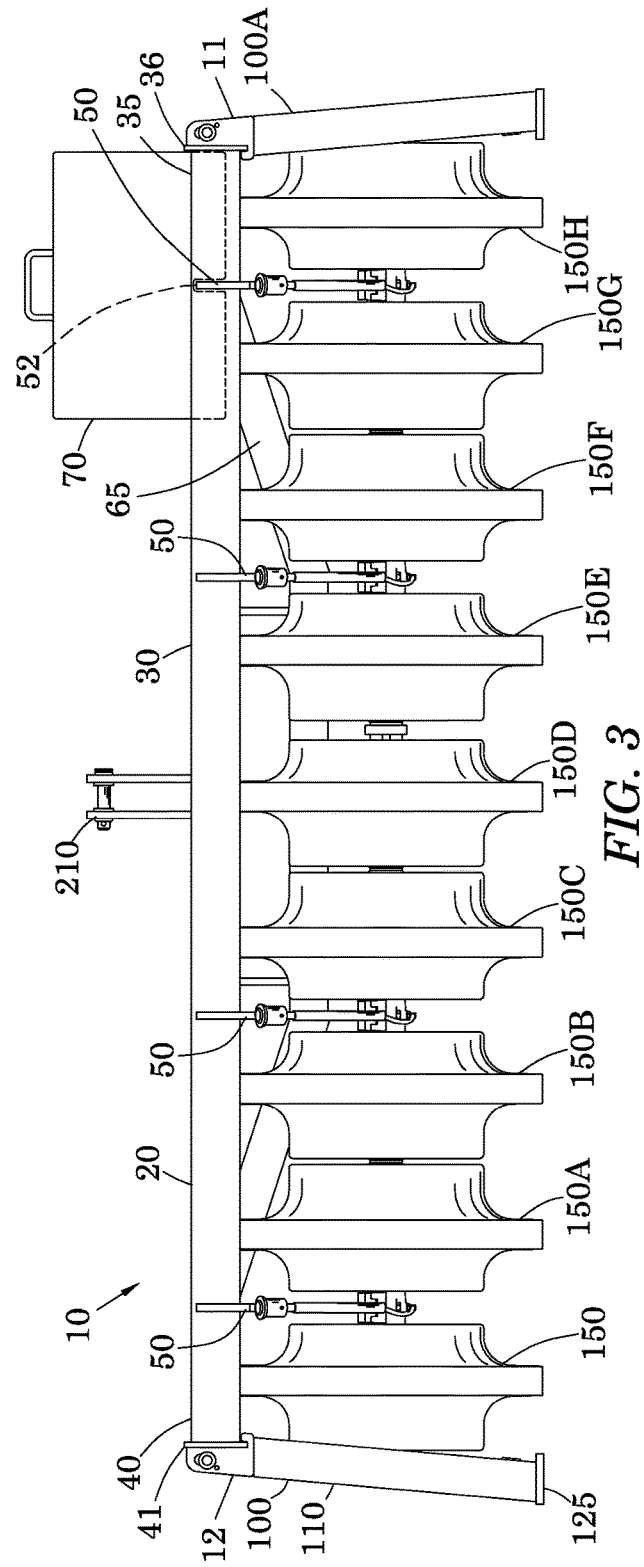

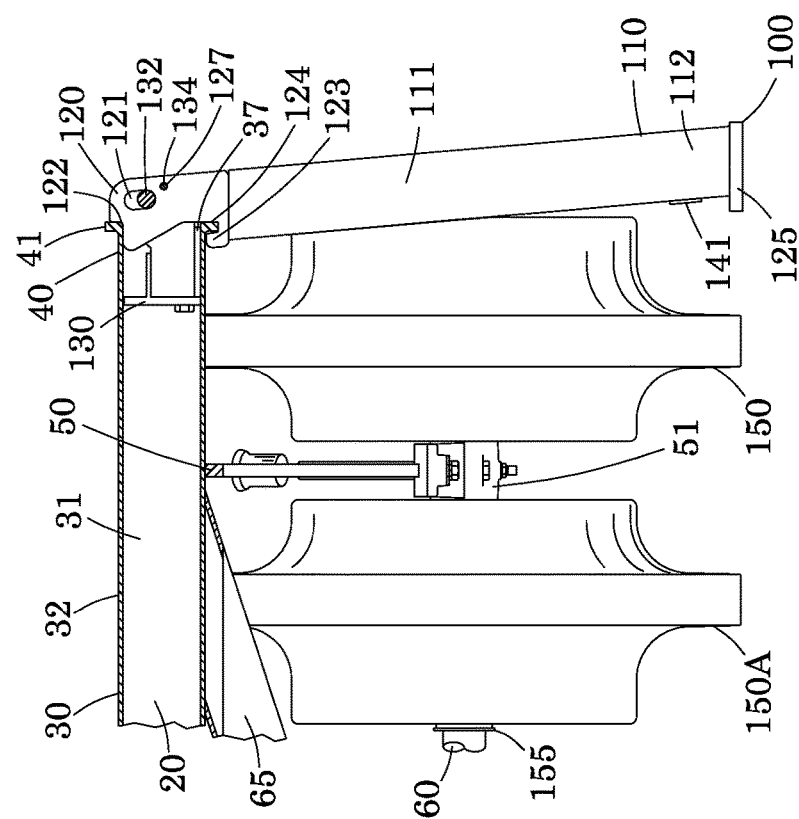
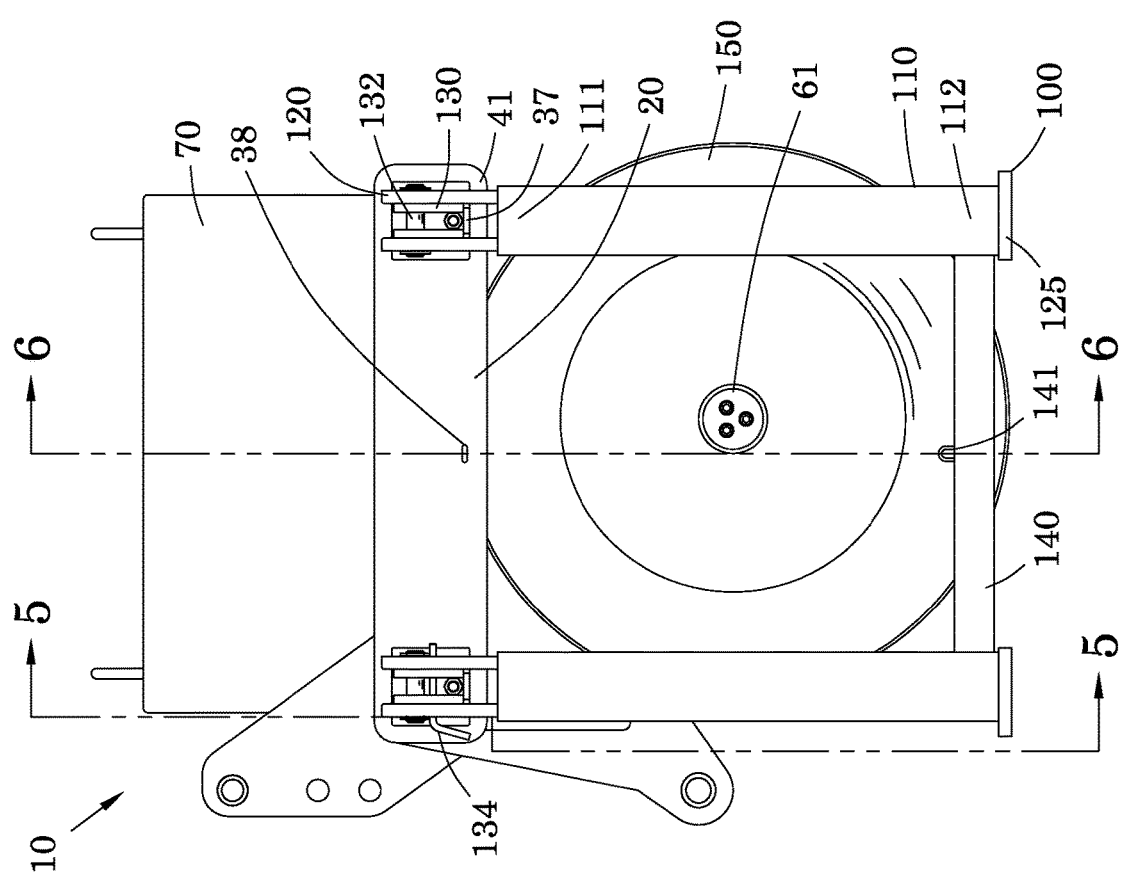

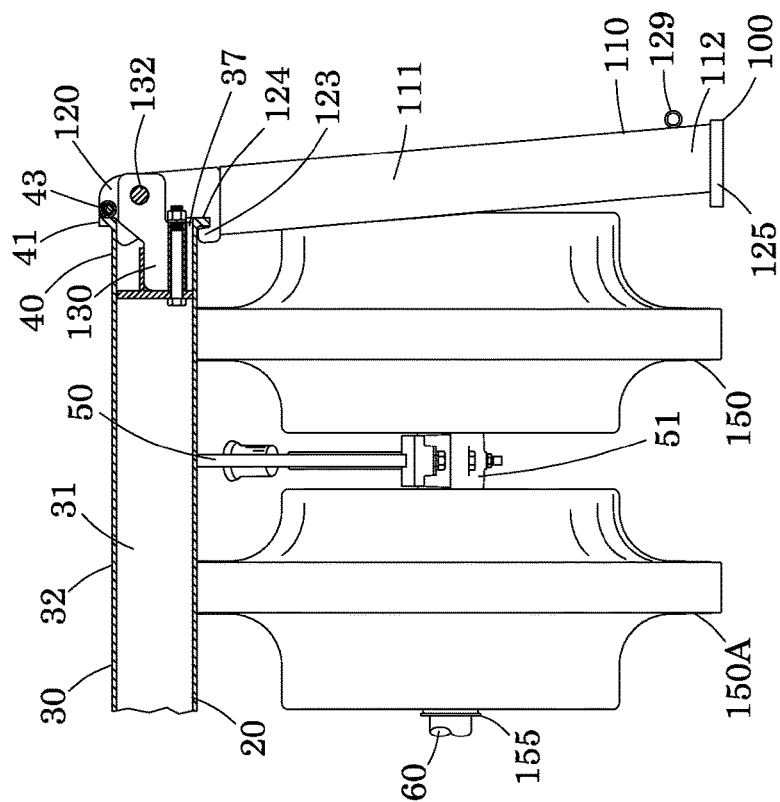
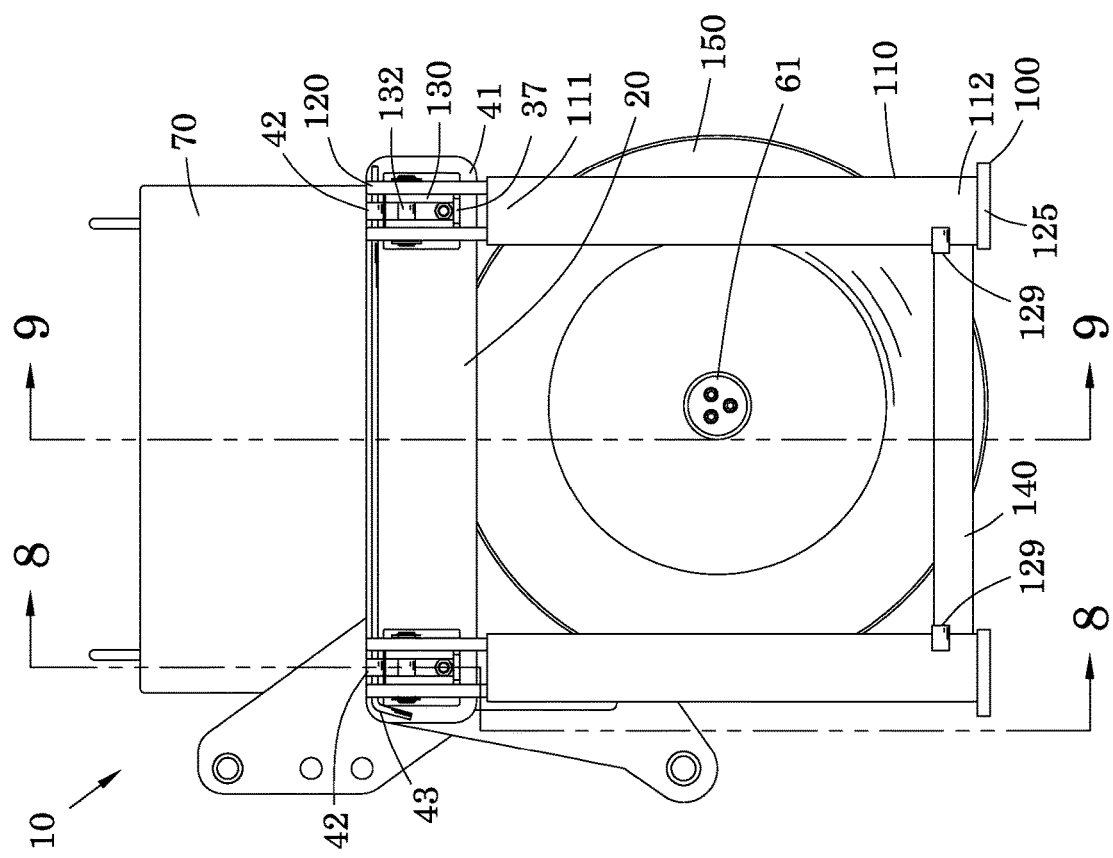
FIG. 8
FIG. 7

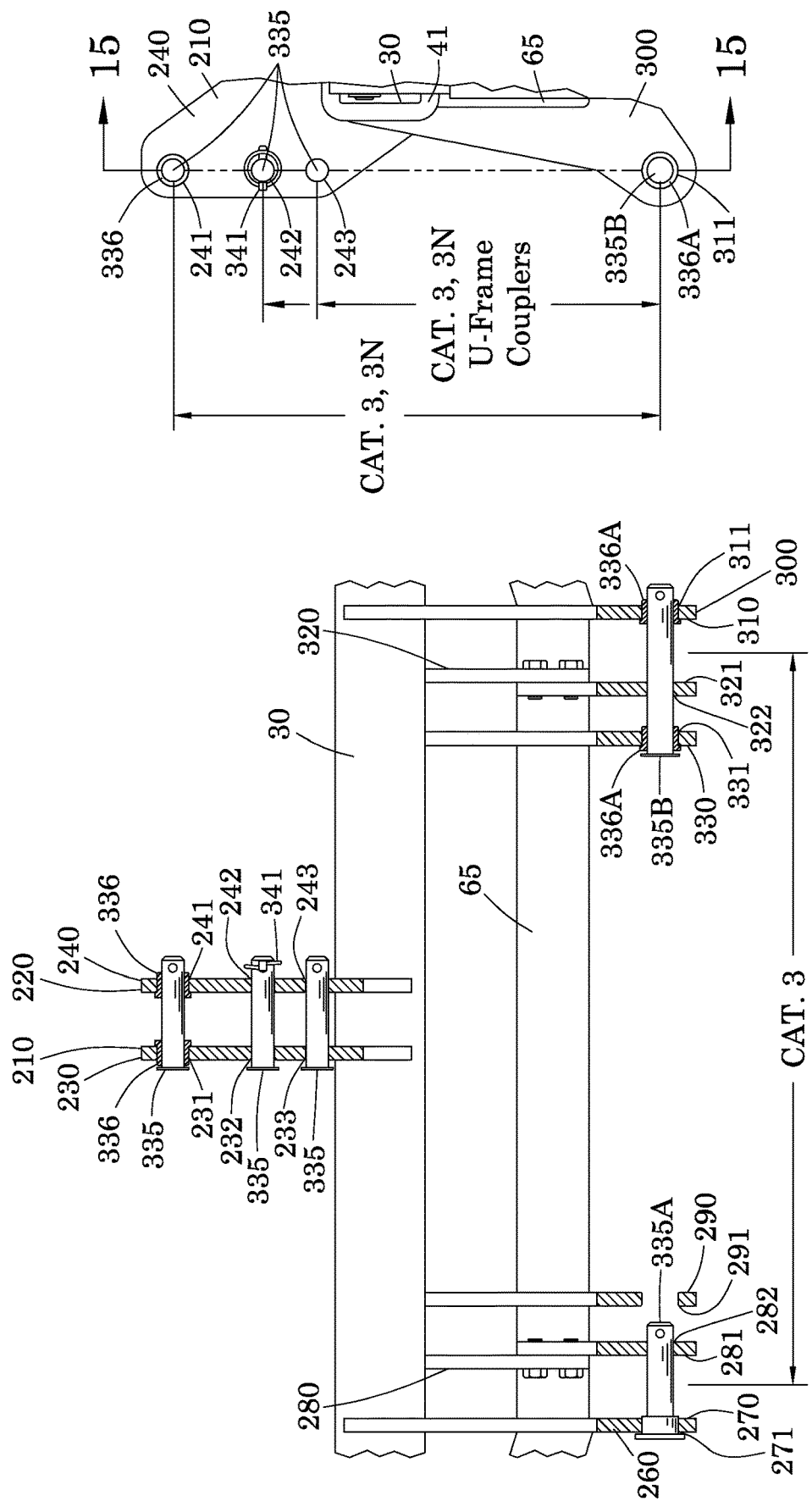

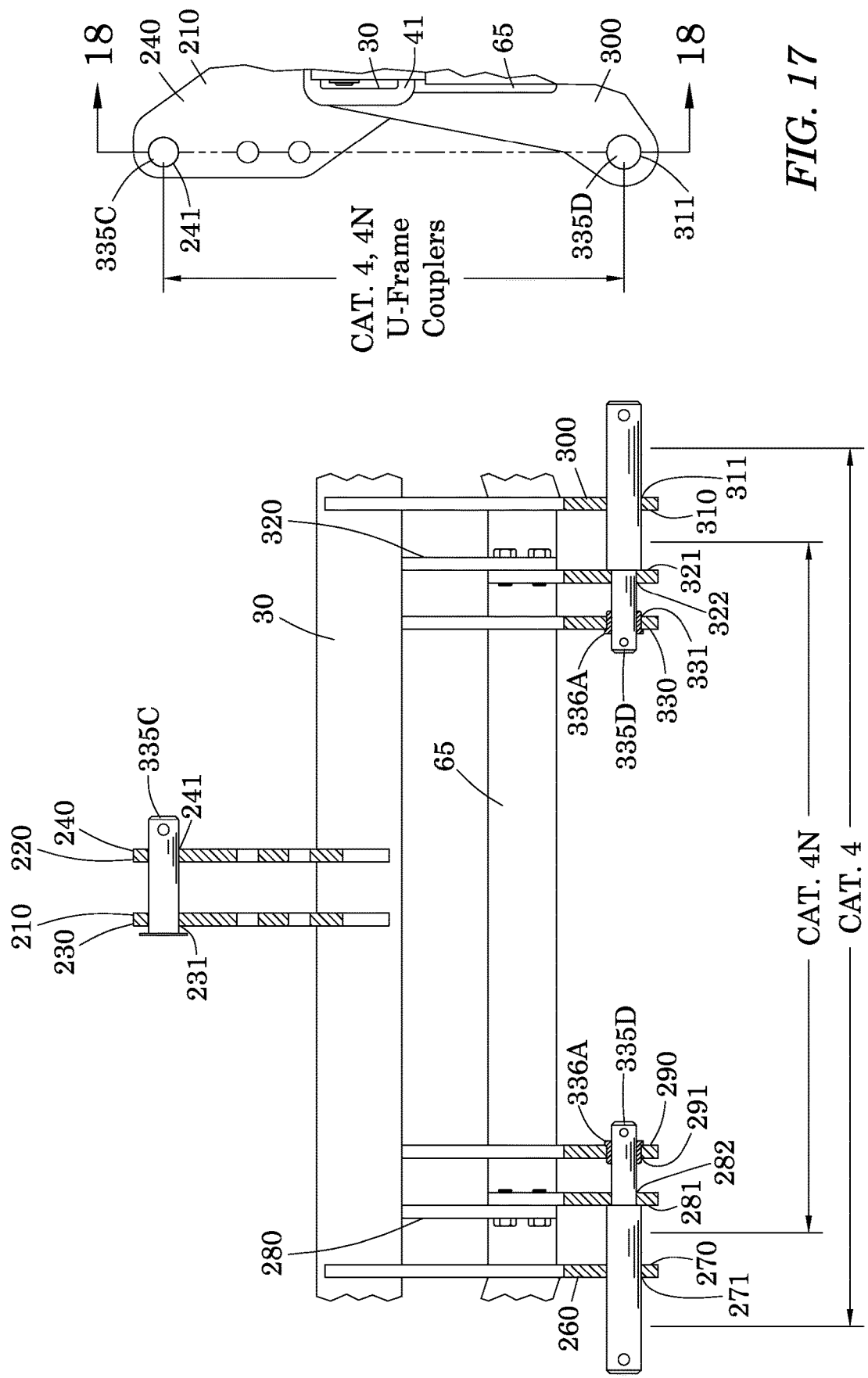

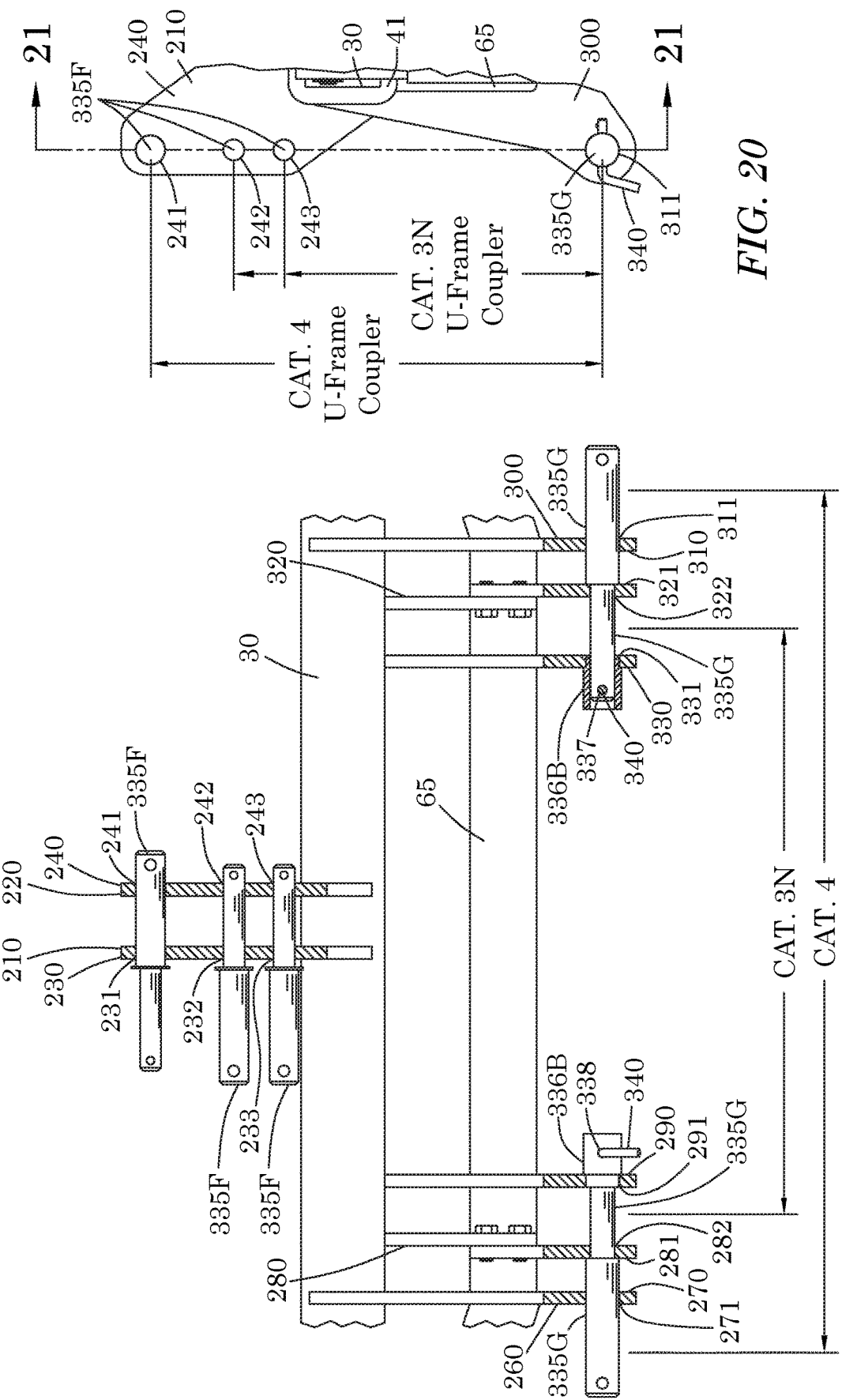

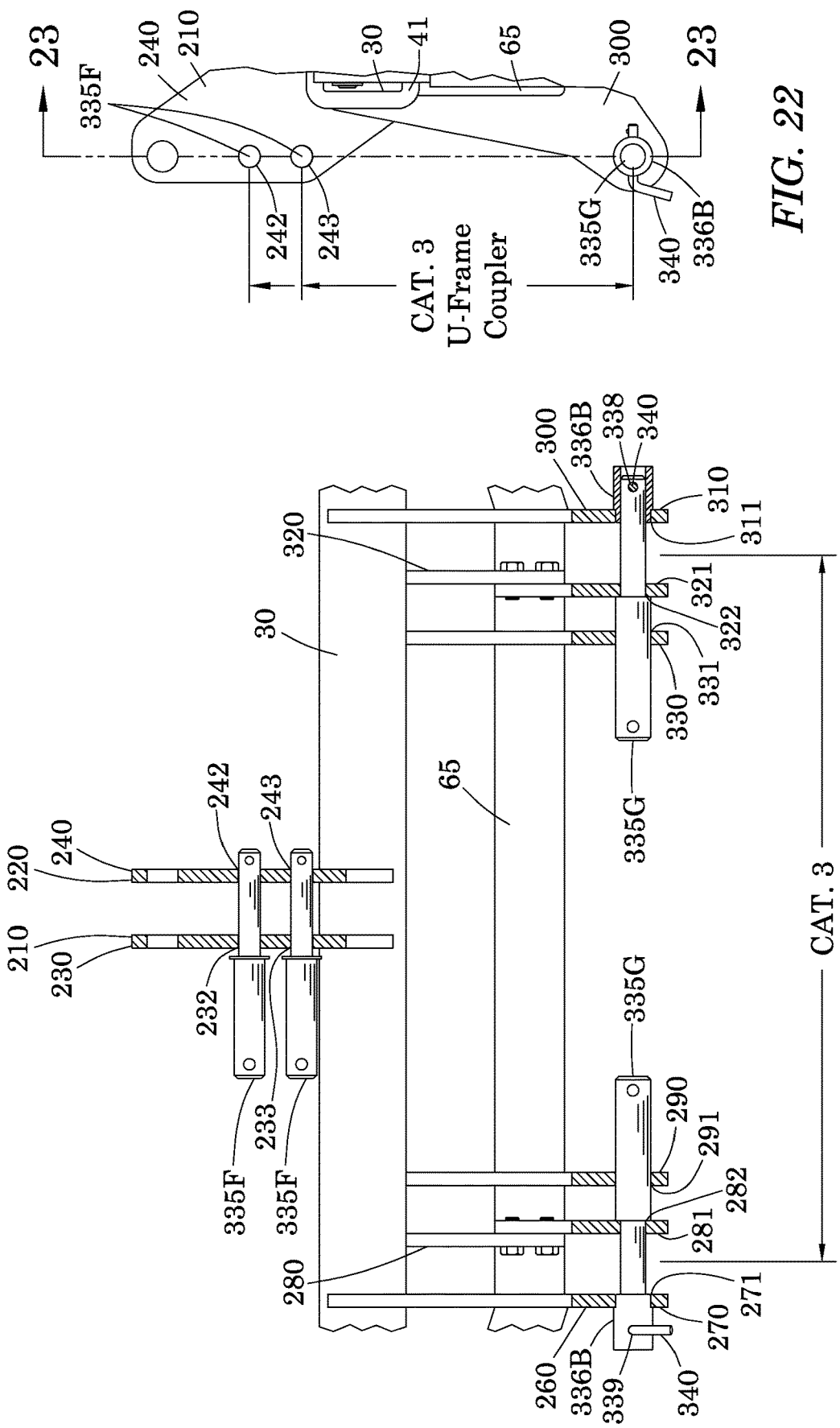

FORAGE COMPACTOR

This U.S. utility patent application claims priority on and the benefit of provisional application 61/968,992 filed Mar. 21, 2014, the entire contents of which are hereby incorporated herein by reference.

BACKGROUND OF THE INVENTION

1. Field of the Invention

The present invention relates to an improved forage compactor and in particular to an improved forage compactor having at least one asymmetric wheel, an integrated stand and an improved connection system.

2. Description of the Related Art

Forage can be comprised of chopped corn, hay or other feed stuffs. Without the aid of compression equipment, a large amount of air is entrapped or contained within piles of forage. The air increases the rate of spoilage of the forage. It is therefore desirable to remove entrapped or incorporated air from the forage in order to increase forage quality and storage times.

There have been many methods developed over the years that seek to accomplish the goal of removing air from the forage.

One such method is a tower silo. Forage is vertically stacked in a tower silo. The vertical stacking takes advantage of gravity, which forces an amount of compaction as the tower silo is filled.

Another such method is a bag silo. Bag silos lay horizontal and are filled or packed mechanically with a machine. The bag silos are then sealed.

A further type of silo is a bunker silo. A bunker silo is driven over by a vehicle whereby the forage is compressed in order to remove the air before being sealed. The vehicle, which could be a vehicle with auxiliary weights attached thereto, can drive a wheel or an implement having multiple wheels over the forage. Two such implements are Faster Packer and Spanjer Impact.

While useful, these implements use wheel profiles that have lips that can lift forage during rotation instead of achieving a desired level of compaction.

The implements also require a stand to be transported for when the implement is not in use.

Thus there exists a need for a forage compactor that solves these and other problems.

SUMMARY OF THE INVENTION

A forage compactor is provided having a frame that has cross bars supporting risers that in turn support a shaft. At least one asymmetric wheel is supported by the shaft. The wheels can be paired whereby journals are used to connect to the shaft between recesses of respective wheels. Each wheel has a first side and a second side, each with radiused portions that turn forage away from the wheel. The wheels have a band that is flush with the outer portion of the wheel sides to prevent lifting of the forage. A storage assembly is provided and is integrated into the framework. The storage assembly can be stored within the frame when the compactor is in use, and can be deployed to a locked position in order to store the compactor. A hitch framework is provided that can attach to multiple categories of three point hitches.

According to one advantage of the present invention, a wheel with an outer band that is flush with the sidewalls is provided. This advantageously allows the wheels to compact the forage without lifting or aerating any of the forage. The wheel directly compacts the forage in primary compaction zones.

According to another advantage of the present invention, each wheel two sidewalls with profiles incorporating a radius that allows the wheels to smooth out the forage as it is compacted in secondary compaction zones.

According to a further advantage of the present invention, some wheels (in embodiments having asymmetric wheels) can be joined in oppositely oriented pairs whereby a recessed area is formed between the wheels. A journal can connect to the shaft between the wheels. The space or recessed area between the wheels provides protection to the journals yet allows for improved access to the journals. Similarly, in embodiments having symmetric wheels with recesses, the journals are located within the recessed areas.

According to a further advantage of the present invention, even with the use of journals, the spacing between the wheel centers is constant. This advantageously provides for a uniform compaction along the longitudinal axis of the compactor.

According to a still further advantage of the present invention, a storage assembly is integrated into the frame. Advantageously, a separate stand is not required for storage.

According to a still further advantage of the present invention, the storage assembly can be locked in a storage position and in the deployed position.

According to a still further advantage yet of the present invention, a hitch assembly is provided that can be connected to multiple categories of three point hitches. This advantageously allows the present invention to be utilized without the need for specialized framework for each category of hitch.

According to a still further advantage yet of the present invention, a spring loaded or pressurized lubricator is provided to provide lubrication to the journals. This advantageously improves lifespan.

According to a still further advantage yet of the present invention, keys are provided for securing weights onto the framework. The keys mate with the weights to prevent the weights from inadvertently disengaging from the compactor. The keys are laterally oriented to prevent longitudinal shifting and are longitudinally spaced along the top of the compactor.

Other advantages, benefits, and features of the present invention will become apparent to those skilled in the art upon reading the detailed description of the invention and studying the drawings.

BRIEF DESCRIPTION OF THE DRAWINGS

FIG. 2 is a top view of the embodiment illustrated in FIG. 1.

FIG. 3 is a rear view of the embodiment illustrated in FIG. 1.

FIG. 4 is an end view of the embodiment illustrated in FIG. 1.

FIG. 5 is a close up sectional view of an embodiment of a storage assembly taken along line 5-5 in FIG. 4 in the deployed position.

FIG. 7 is an end view similar to FIG. 4, but shows an alternative embodiment of a fastener.

FIG. 8 is a cross-sectional view taken along line 8-8 in FIG. 7.

FIG. 14 is a side view of an embodiment of a hitch framework useful for category 3 and 3N hitches.

FIG. 15 is a cross-sectional view taken along line 15-15 in FIG. 14 set up for a category 3 hitch.

FIG. 17 is a side view of an embodiment of a hitch framework useful for category 4 and 4N hitches.

FIG. 18 is a side view taken along line 18-18 in FIG. 16 set up for category 4 and 4N hitches.

FIG. 20 is a side view of an embodiment of a hitch framework useful for category 4 and 3N hitches.

FIG. 21 is a cross-sectional view taken along line 21-21 in FIG. 20.

FIG. 22 is a side view of an embodiment of a hitch framework useful for category 3 hitches.

FIG. 23 is a cross-sectional view taken along line 23-23 in FIG. 22.

DETAILED DESCRIPTION OF PREFERRED EMBODIMENTS

Figure 1:
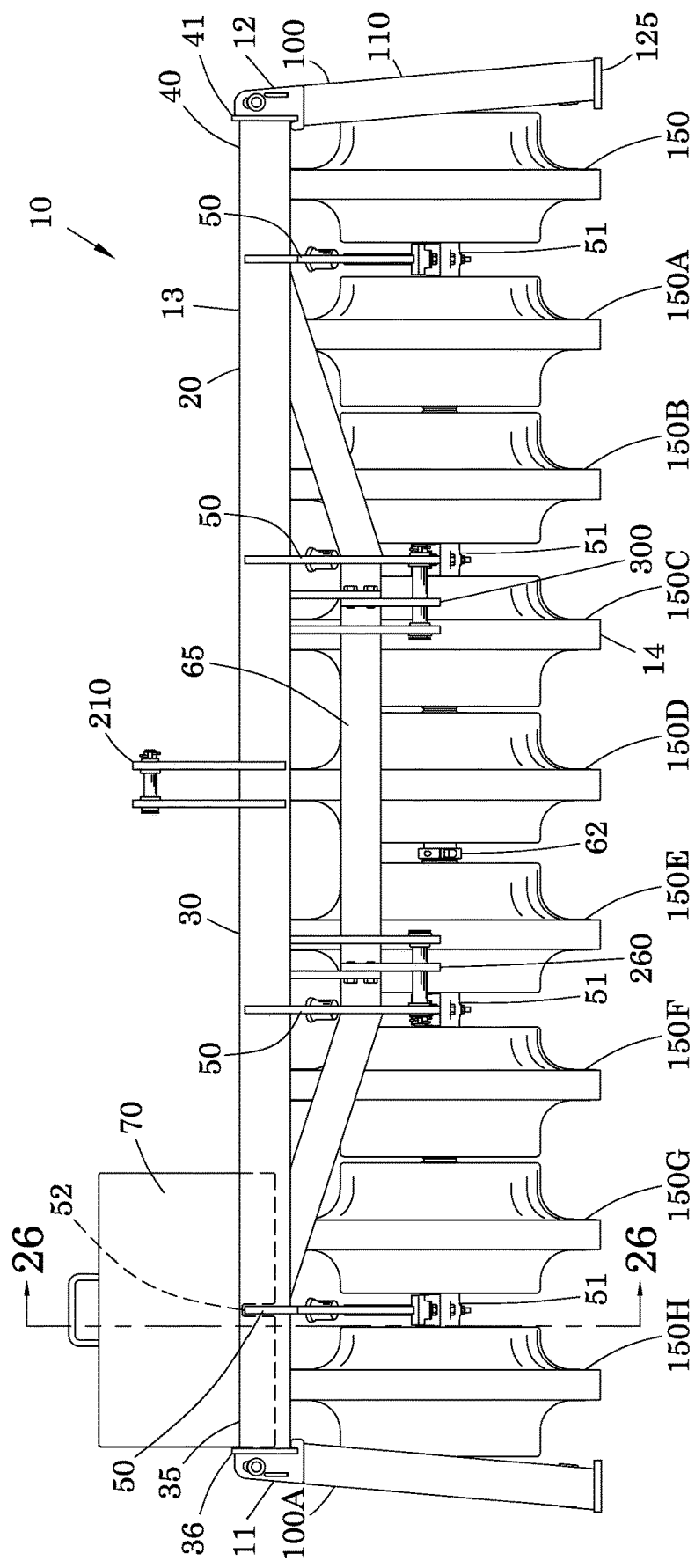
FIG. 1 is a front view of a preferred embodiment of the present invention.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

A forage compactor 10 is provided, as seen in one embodiment in FIGS. 1-6A, 10, 11 and 26. The forage compactor 10, or simply compactor, has opposed ends 11 and 12, a top 13 and a bottom 14, a front 15 and a rear 16 or back.

Figure 5A:
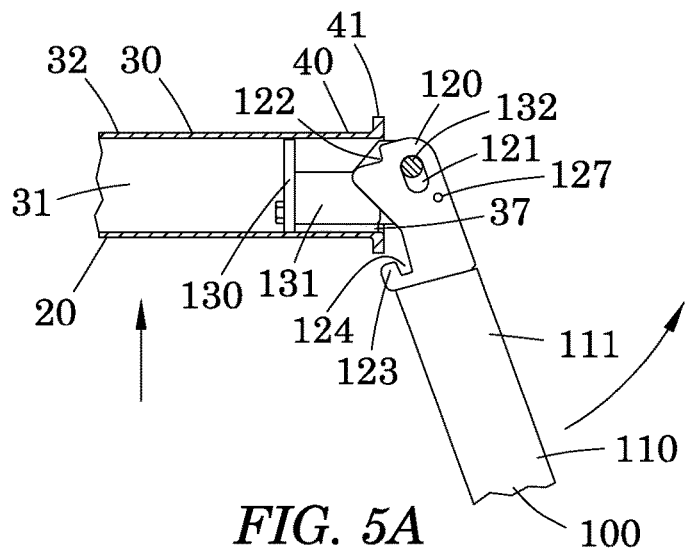
FIG. 5A is similar to FIG. 5, but shows an intermediate position of the storage assembly relative the frame.
Figure 5B:
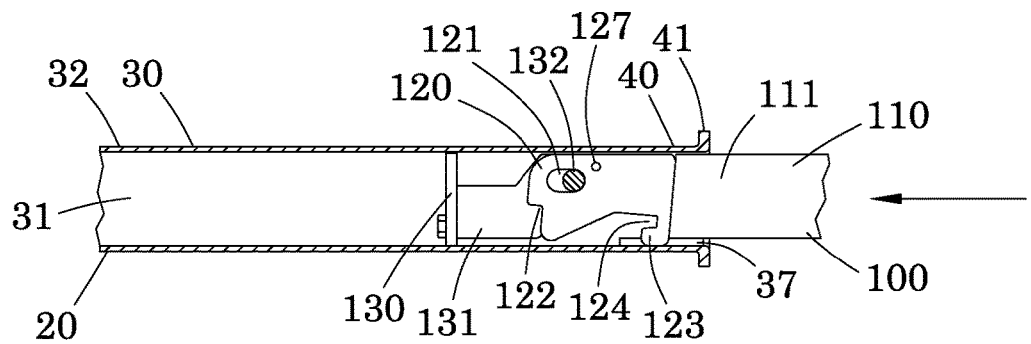
FIG. 5B is similar to FIG. 5, but shows an intermediate position of the storage assembly relative the frame.
Figure 5C:
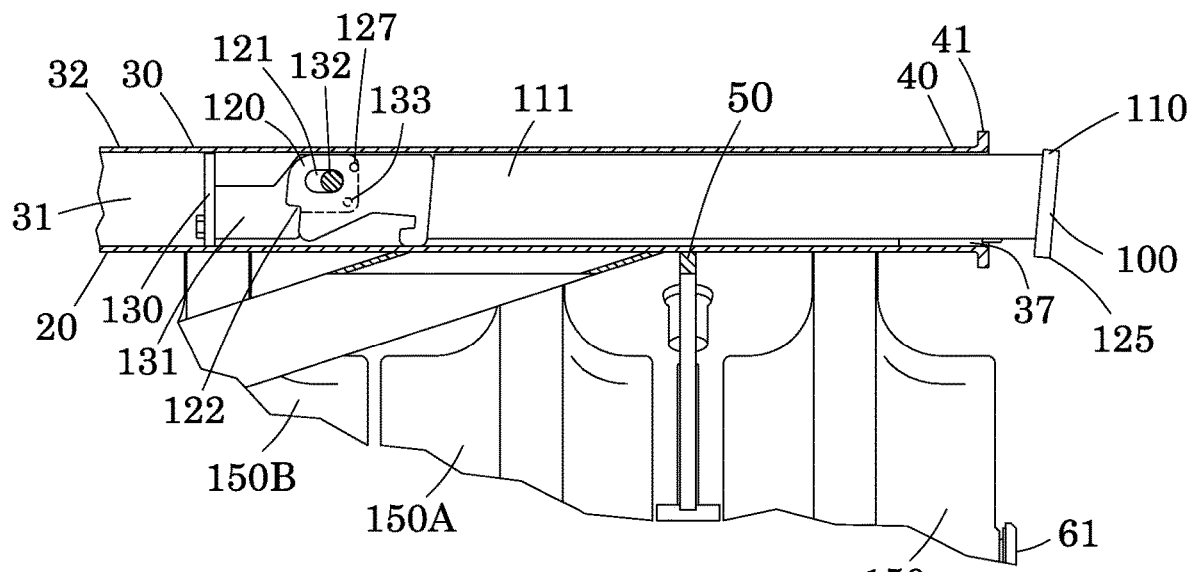
FIG. 5C is similar to FIG. 5, but shows the storage assembly in the stowed or storage position.

A frame 20 is provided and is seen in FIGS. 1-6A. The frame 20 has two cross bars 30, each having an inside 31 and an outside 32. The cross bars 30 further have two ends 35 and 40, each having a perimeter lip 36 and 41, respectively. Retainers are further provided. A retainer 37 is illustrated in FIG. 4-5C as a plate on the bottom portion of the inside of the cross bars.

Figure 26:
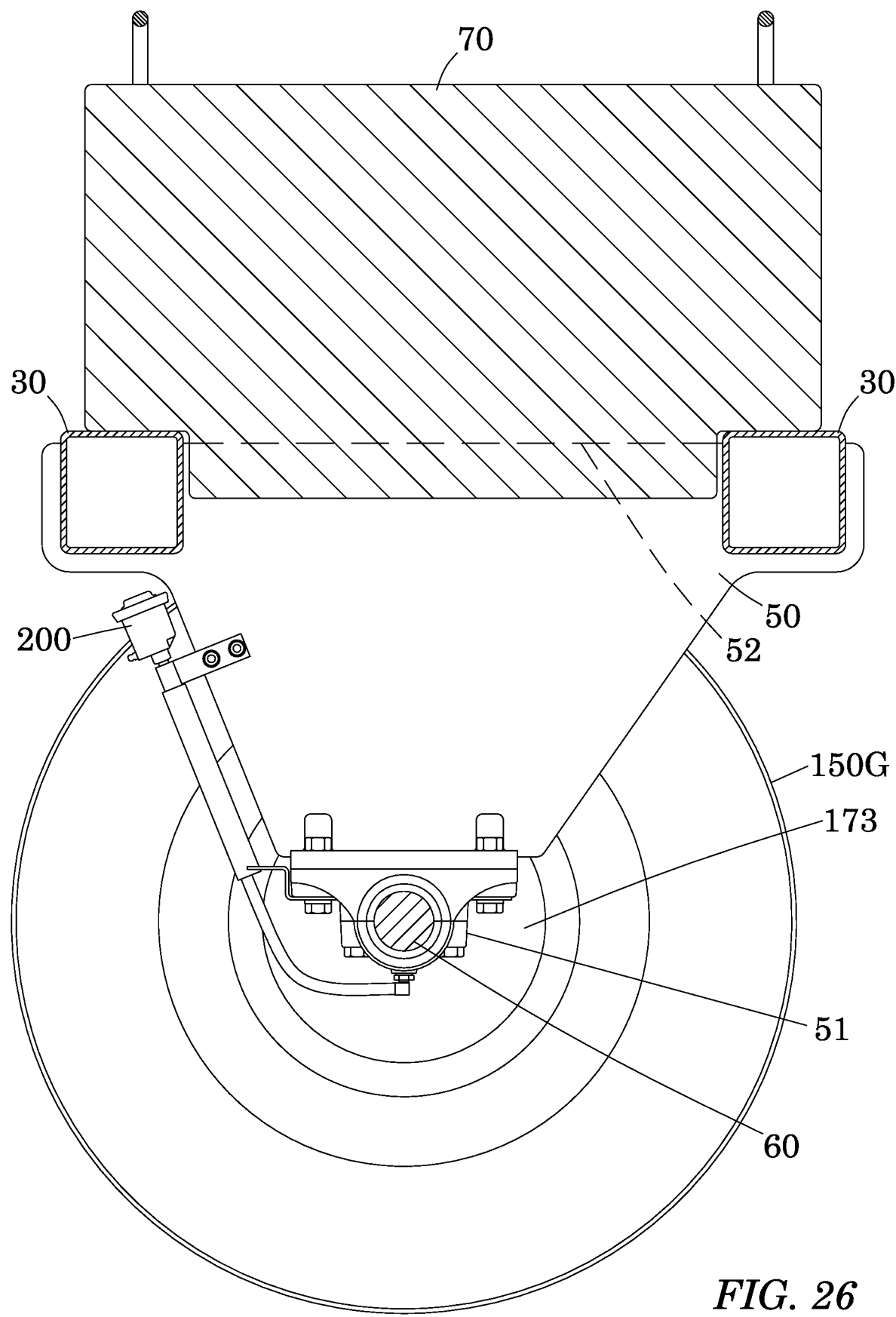
FIG. 26 is a cross-sectional view taken along line 26-26 in FIG. 1.

Risers 50 are further provided and secure to a shaft 60 with journals 51. Risers 50 can be formed of plates secured to the cross bars 30. The risers have a top and a bottom. The top of the risers can form a key 52 that spans laterally across the frame 20 between the cross bars. As seen in FIG. 26, the key wraps around the bottom of the cross bars. The cross bars 30 are preferably parallel with a frame longitudinal axis. There are preferably four risers and journals spaced longitudinally on the compactor.

The shaft 60 is preferably parallel to the frame longitudinal axis. End caps 61 are provided at both ends of the shaft 60. A shaft collar 62 is further provided. The shaft collar 62 is keyed so that rotation of a center wheel engages the collar 62 which in turn forces the shaft 60 to rotate along with rotation of the wheels.

A depending bar 65 is further provided. The depending bar 65 depends from the front cross bar 30 and has a segment that is parallel to the cross bar.

Weights 70 can be secured to the compactor by mating with keys 52. In this regard, the weights are securely held in place (via the weight of the weights) and are unable to move along the longitudinal axis of the frame. The weight 70 further is held or bound laterally between the cross bars to prevent the weight from laterally moving. While a single weight is illustrated, it is appreciated that more (or no additional weights) could be used without departing from the broad aspects of the present invention. The weights have handles for easy insertion onto and removal from the keys.

Two storage assemblies 100 and 100A are provided. Storage assembly 100 is at the first end 11 of the compactor 10, and assembly 100A is at the second end 12 of the compactor. Storage assembly 100A is similar (preferably a mirror image) to assembly 100. For sake of brevity, storage assembly 100 is described in detail and it is understood that storage assembly 100A is similarly constructed.

Storage assembly 100 has two legs 110, as seen in FIG. 4, joined with a cross brace 140. The legs are identical and act in unison with two respective receivers 130 relative to the two cross bars 30. Thus, for brevity, only a single leg is described.

Figure 6:
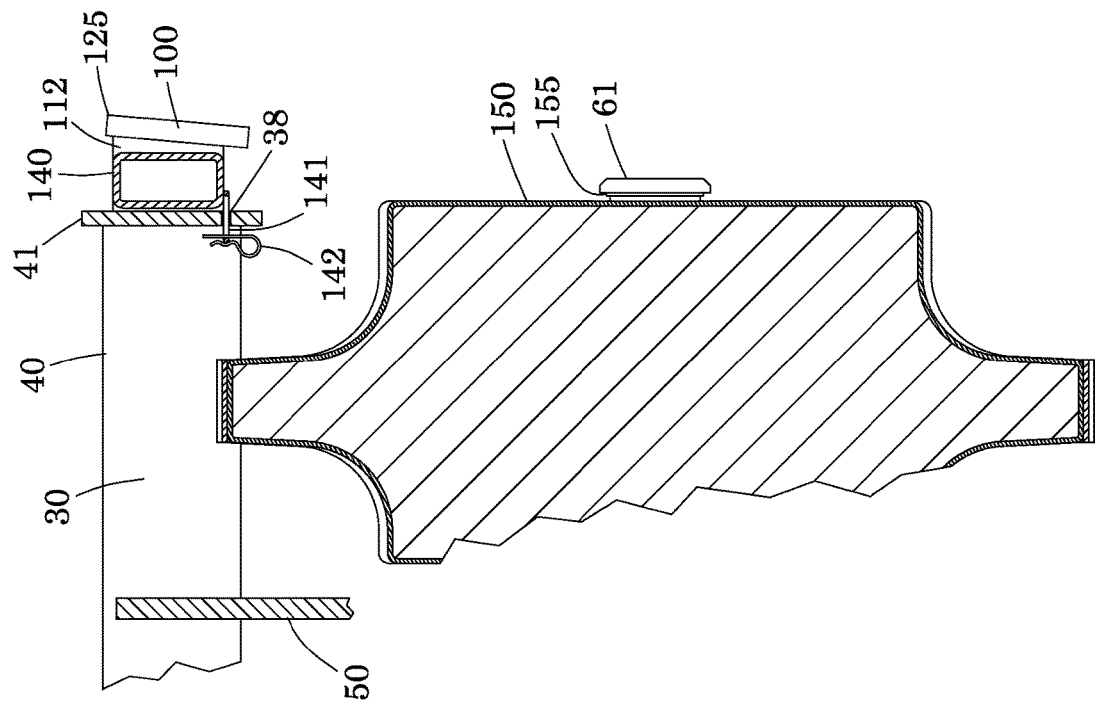
FIG. 6 is a cross-sectional view taken along line 6-6 in FIG. 4.
Figure 6A:
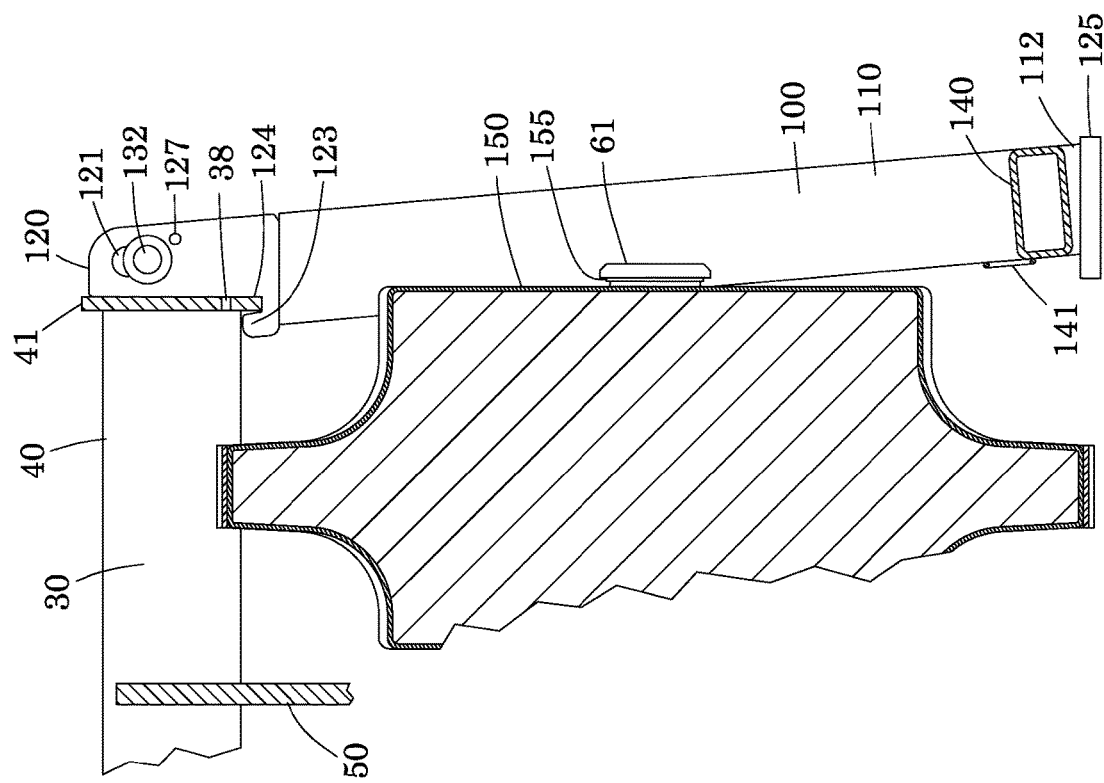
FIG. 6A is similar to FIG. 6, but shows the storage assembly in the stowed position.

Turning now to FIGS. 5-6A, it is seen that leg 110 has a top 111 and a bottom 112. A head 120 is at the top 111 and a foot 125 is at the bottom. The head 120 is preferably formed of two plates that are identical. It is understood that a single plate could be used instead of two plates without departing from the broad aspects of the present invention. The head 120 has a slot 121, a notch 122 on the top perimeter and a lug 123 defining a recess 124 at the front of the head 120. A fastener hole 127 is through the head.

The receiver 130 likewise is preferably made of two plates. Yet, it is understood that a single plate could be used without departing from the broad aspects of the present invention. The receiver 130 has a body 131 that is received within the interior or inside 31 of the cross bar 30 of the frame 20. A pin 132 is provided for being received within slot 121 of the head 120. The pin 132 is movable within the slot along the slot axis. In this regard, the leg can be moved along the slot axis relative to the receiver 130. The retainer 37 secures the receiver within the inside of the cross bars so that the storage assembly is not inadvertently removed from the end of the cross bar. The head 120 passes on one or both sides of the retainer 37. A fastener hole 133 passes through the receiver. The fastener hole 133 is aligned with fastener hole 127 when the legs are deployed and can receive a fastener 134 to lock the leg in the deployed position.

The leg 110 has a retracted, storage or stowed position within the frame 20 as seen in FIGS. 5C and 6A. The leg also has a deployed or locked position as seen in FIG. 5. In the locked position, the storage assembly 100 supports compactor 10 to prevent tipping and to allow easier hitching as the compactor remains stable and level. The lower portion of the lip 41 is received within recess 124, the top portion of the lip engages the notch 122 and the pin 132 is held at the bottom of the slot 121. Further, fastener 134 can pass through fastener holes 133 and 127. This is the lock position whereby the legs cannot be laterally moved relative to the frame 20. In this position, the legs are held in an inclined plane that approaches but preferably is not at a vertical orientation.

In order to unlock the storage assembly from the locked deployed position, the user first removes fastener 134 and then lifts the frame thereby lifting the pin 132 within the slot 121 (lip 41 also is removed from recess 124). The length of the slot is preferably equal to or greater than the depth of the recess. Once lifted, the legs can then be laterally swung (in direction of the arrow in FIG. 5A until the longitudinal axis of the legs are parallel to the longitudinal axis of the cross bars 30. Then, the legs 110 are moved into the frame along an axis depicted by the arrow in FIG. 5B, where the legs can be stored in a retracted position.

A slot 38 is further provided on the end of the frame 20. A tab 141 is provided for being received in slot 38 and being secured with a pin 142 or the like. The tab 141 is preferably a loop that upstands from the cross bar 140 of the storage assembly 100. When tab 141 is secured with slot 38 with a pin 142 or other fastener, the storage assembly 100 cannot deploy and the legs remain retained within the frame cross bars 30.

Figure 10:
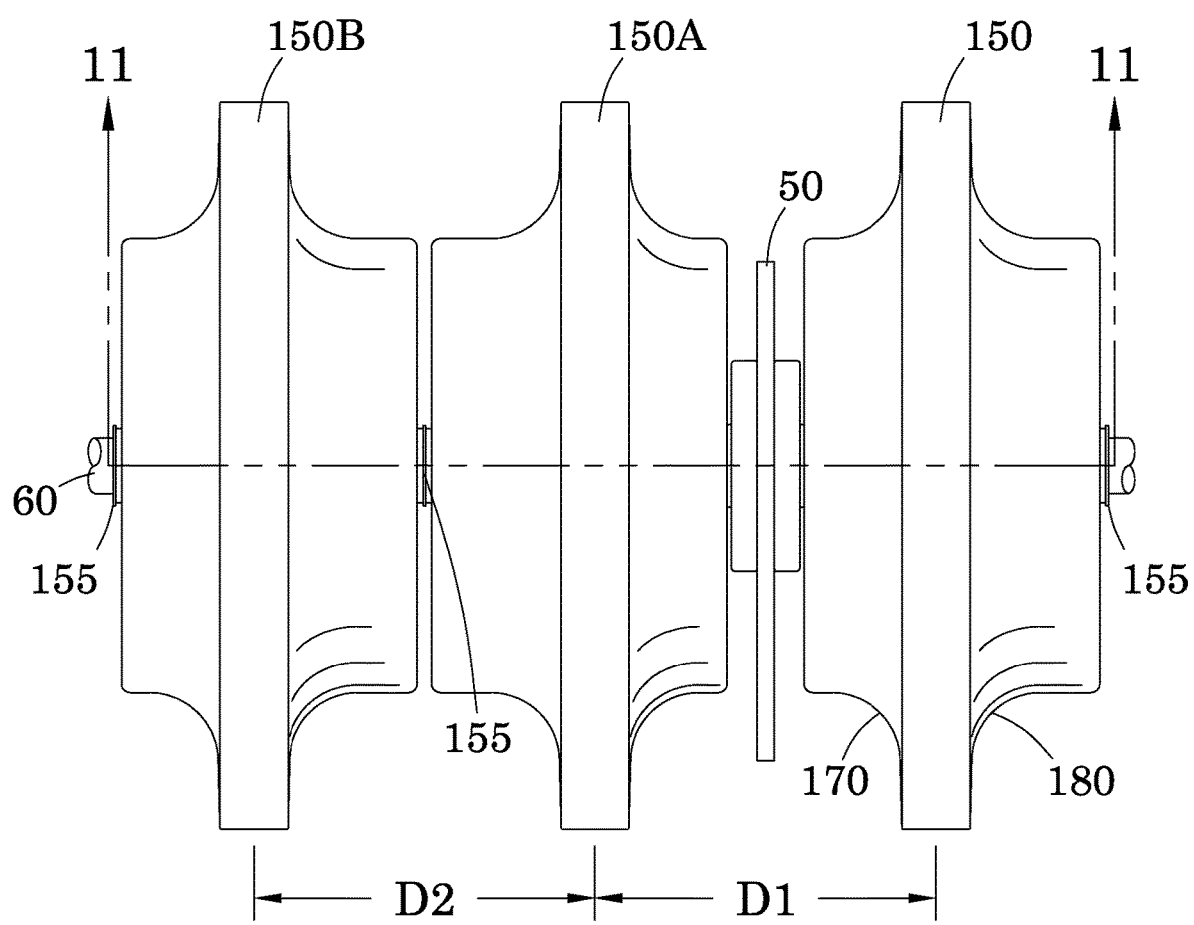
FIG. 10 is a top view showing three asymmetric wheels in a side by side relationship.
Figure 11:
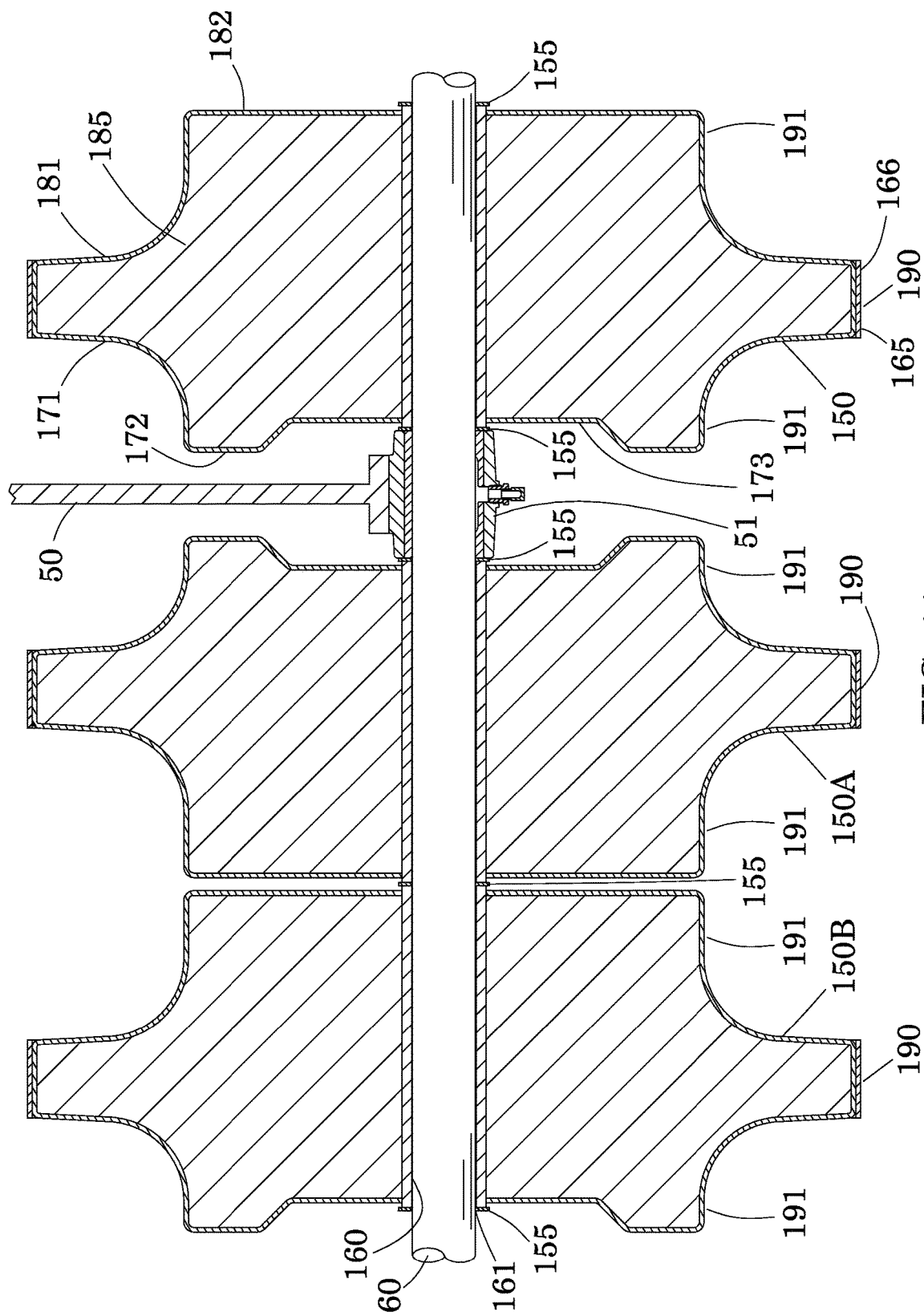
FIG. 11 is a cross sectional view taken along line 11-11 in FIG. 10 and showing primary compaction zones and secondary compaction zones.

Turning now to FIGS. 10 and 11, it is seen that one preferred embodiment of a wheel 150 is provided. A radial distance of inner and outer are described, with the distance being described as inner are closer to the center of the wheel and the distance being described as outer are further away radially from the center of the wheel.

Wheel 150 has a center 160 with a hole 161 there through. The center 160 has a diameter of sufficient size to encircle shaft 60. The wheel 150 has an outer perimeter 165 (or simply, perimeter). A band 166 is wrapped around the wheel at the outer perimeter. While a band is a preferred surface, it is appreciated that other surfaces, including the outer ends of the wheel sections, could be used without departing from the broad aspects of the present invention. The outer perimeter preferably has a diameter of approximately 32 inches. Of course, it is appreciated that the diameter could be larger or smaller without departing from the broad aspects of the present invention. The band 166 is preferably a replaceable band that can be made of stainless steel. Yet, other materials could be used without departing from the broad aspects of the present invention. The band 166 is preferably flush with a first side 170 and a second side 180 wherein the band does not have a lip or other protruding portion that could lift forage during operation.

Side 170 has a radially located outer wall portion 171 and a radially located inner wall portion 172 which together define a first side profile. The outer wall portion has a radius or transition that separates or transitions from a vertical segment (perpendicular to the outer band) to a horizontal segment (generally parallel to the outer band). The horizontal segment is approximately 6 inches from the outer band. The outer end of the horizontal segment is about 4 and ¼ inches from the vertical segment. The radius can be alternatively located or have dimensions other that what is shown without departing from the broad aspects of the present invention. The inner wall portion 172 has a recessed area 173.

The second side 180 has a radially located outer wall portion 181 and a radially located inner wall portion 182 which together define a second side profile. The outer wall portion has a radius that separates or transitions from a vertical segment (perpendicular to the outer band) to a horizontal segment (generally parallel to the outer band). The horizontal segment is approximately 6 inches from the outer band. The outer end of the horizontal segment is about 5 and ½ inches from the vertical segment. The radius can be alternatively located or have dimensions other that what is shown without departing from the broad aspects of the present invention. The inner wall portion is preferably flat.

It is understood that the inner wall portion 172 of side 170 is offset from the center of the band a different distance than the inner wall portion 182 of side 180 due to the different horizontal segments of the sides. It is also understood that the radius or transition could occur at the band, or that a different profile could be used instead of a radius without departing from the broad aspects of the present invention. The horizontal portion of the outer wall portion 171 of the first side 170 is preferably equidistant from the wheel center as the horizontal portion of the outer wall portion 181 of the second side 180. This ensure equal compaction on each side of the wheel in the secondary compaction zone.

The wheel 150 is preferably filled with a heavy substance 185 such as concrete. Yet, other substances could be used without departing from the broad aspects of the present invention. In an alternative embodiment, the wheel could be a solid wheel formed without a center hub.

Wheels 150A, 150B, 150C, 150D, 150E, 150F, 150G and 150H are further provided, and are similar to wheel 150. Wheels can be mounted onto the shaft 60 in a first orientation or a second orientation. The second orientation is opposite of the first orientation.

Several bushing washers 155 are provided. The bushing washers 155 are located between adjacent wheels, between wheels and journals and between wheels and end caps.

Both the first orientation and second orientation are illustrated in FIGS. 10 and 11. Wheels can be arranged in alternating orientations along the longitudinal axis of the shaft 60. For example, wheels can be aligned wherein the flat inner wall portion of the second sides of respective wheels can be side to side. Alternatively, the first sides of two respective wheels can be oriented side to side wherein the respective recessed areas can create an area for a journal 51. The journal 51 is accessible between the two adjacent wheels.

It is appreciated that the distance D1 between the centers of the bands of two wheels with the first sides oriented side to side is the same as the distance D2 between the center of the bands of two wheels with the second sides oriented side to side.

In use, the compactor 10 has primary compaction zones 190 and secondary compaction zones 191. In the primary compaction zones 190, the forage is directly compacted through contact with the bands of the respective wheels. Any forage passing to the left or right of a direct compaction zone will enter a secondary compaction zone that can be formed of the outer wall portion 171 of the first side 170 and the outer wall portion 181 of the second side 180 of the wheel 150. Forage can be spread or turned by the radius and compacted by the generally horizontal sections of the wheel profiles in the secondary compaction or compacting zones. There are several primary and secondary compaction zones depending on the number of wheels in the compactor.

A lubricator 200 is also positionable between the two wheels. As seen in FIG. 26, the lubricator is supported by the riser 50 and delivers oil, grease or another lubricant to the journal 51. Lubricator 200 is preferably a spring loaded lubricator. The lubricator has a protective housing and is removable with a journal 51 as one unit.

Figure 8A:
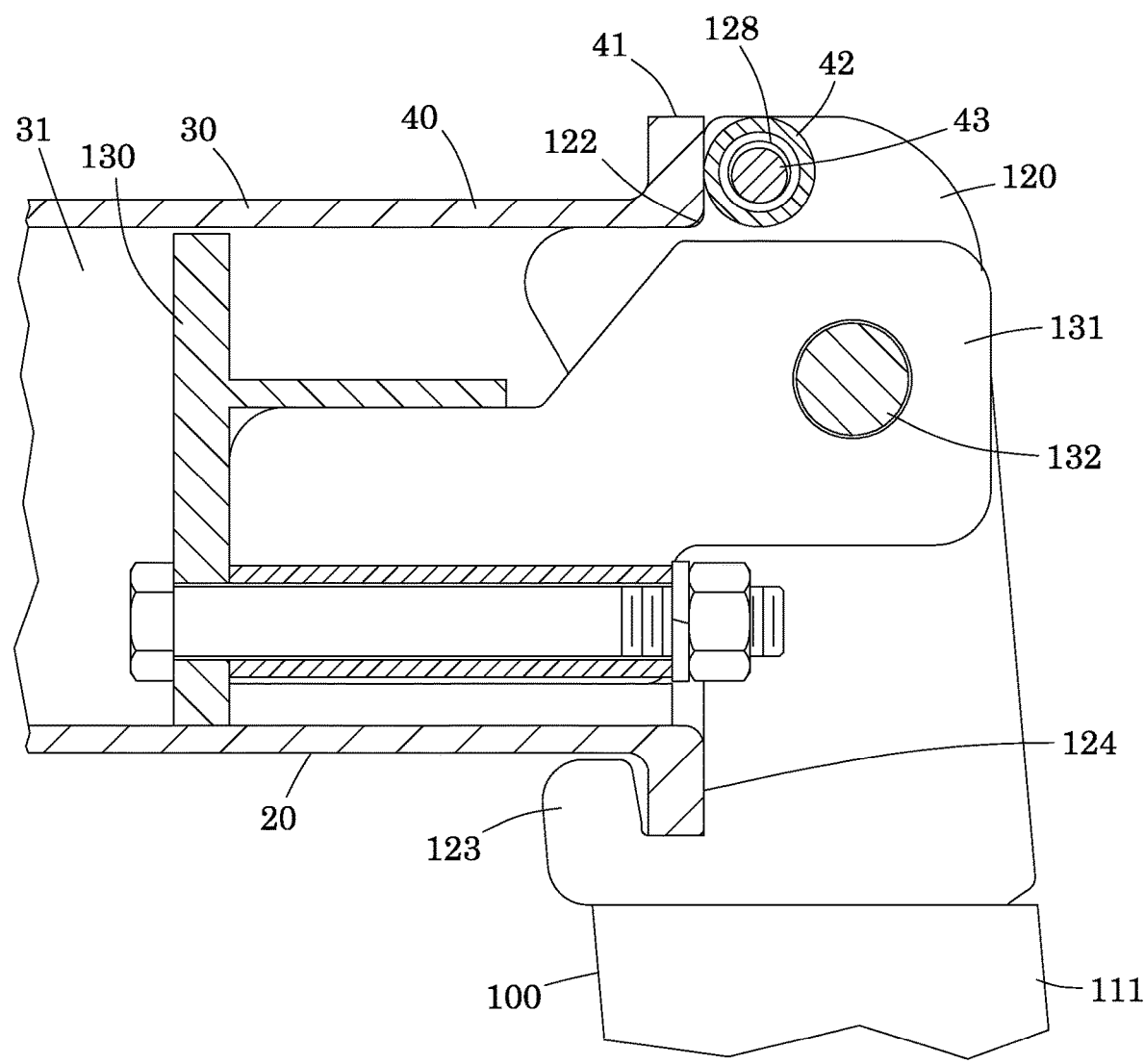
FIG. 8A is a close-up view of a section of FIG. 8.
Figure 9:
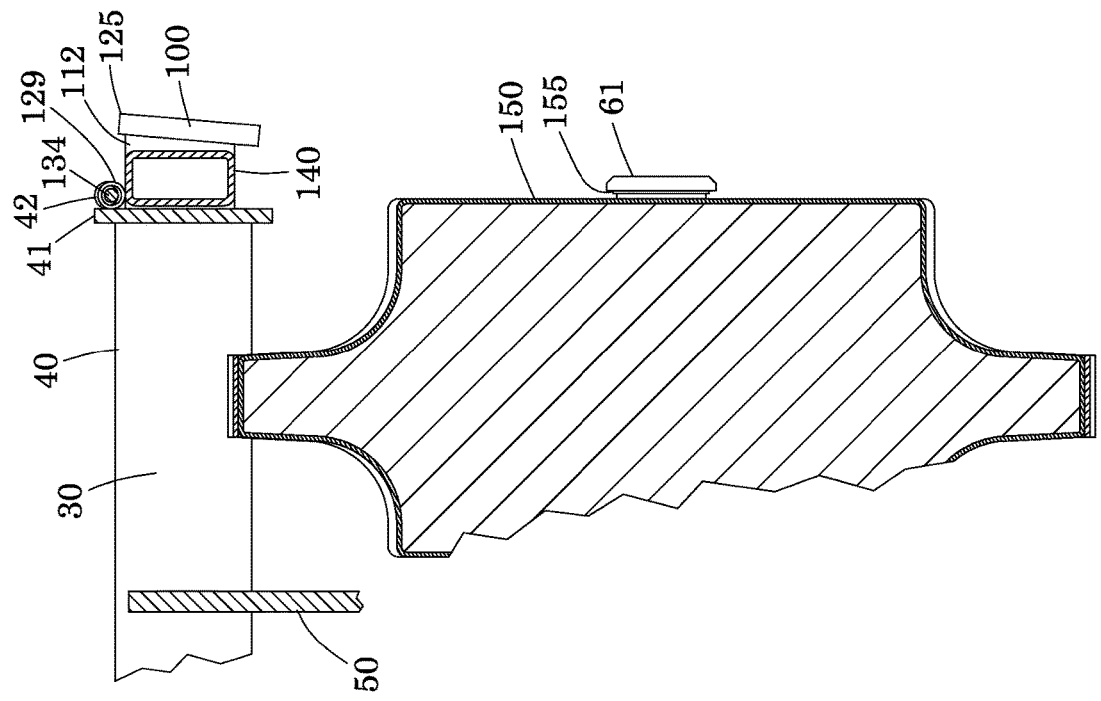
FIG. 9 is a cross-sectional view taken along line 9-9 in FIG. 7.
Figure 9A:
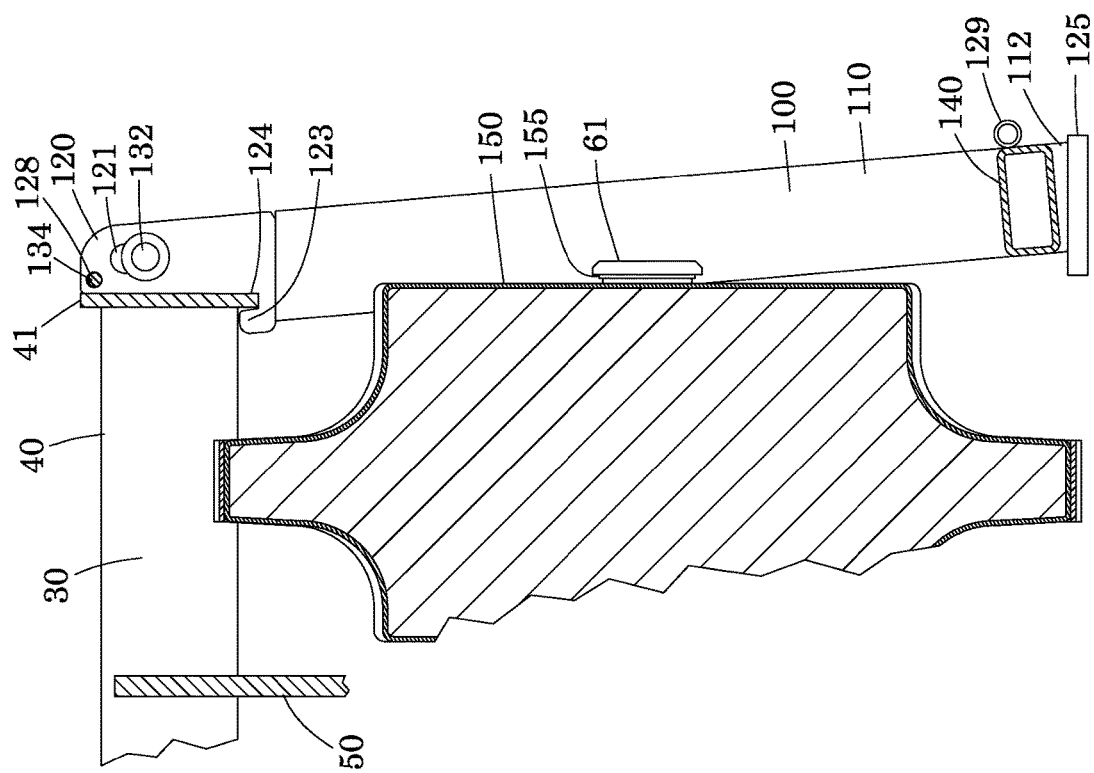
FIG. 9A is similar to FIG. 9, but shows the storage assembly in the stowed position.

Turning now to FIGS. 7-9A, it is seen that an alternative deployment lock or fastener is illustrated. In this regard, the forage compactor 10 has a frame 20 with a crossbar 30. Wheels 150 are provided. Where this embodiment differs is that a fastener hole 128 is provided through the head 120 and a ring 42 is attached to the perimeter lip 41 of the end 40 of the cross bar 30. The hole 128 is aligned with the ring 42 when the legs are deployed and a fastener 43 can pass there through as seen in FIGS. 7-8A. The legs on each side of the storage assembly 100 have a hole 128 and ring 42. A ring 129 is further provided at the bottom 112 or foot end of the leg. The ring 129 is alignable with ring 42 when the storage assembly is in the stored position as seen in FIG. 9A. Fastener 43 then is used to secure or lock the storage assembly in the stowed position as it passes through rings 129 and 42. While rings are illustrated as a preferred embodiment, it is understood that tabs or other structures could alternatively be used without departing from the broad aspects of the present invention.

Figure 12:
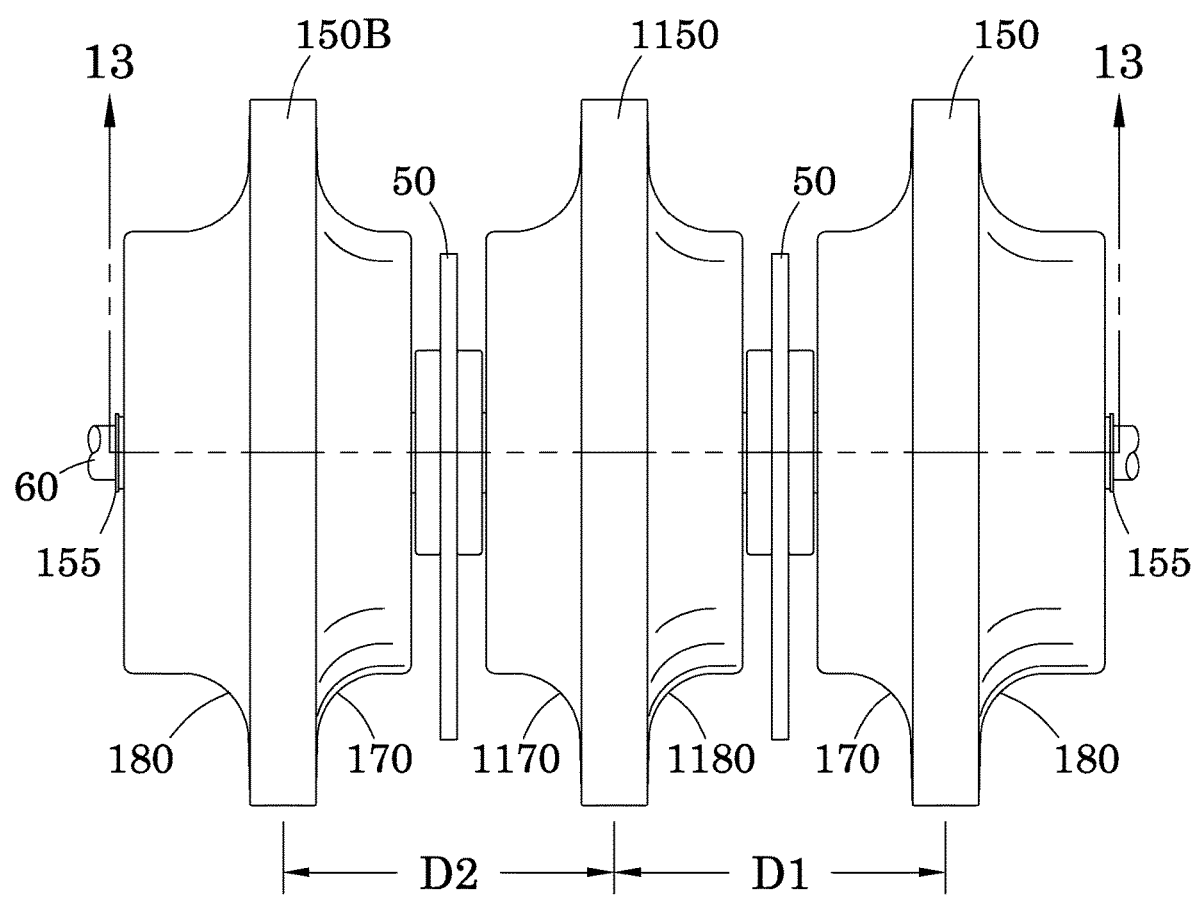
FIG. 12 is a partial top view showing an alternative embodiment of a symmetric wheel in a side to side relationship with two asymmetric wheels.
Figure 13:
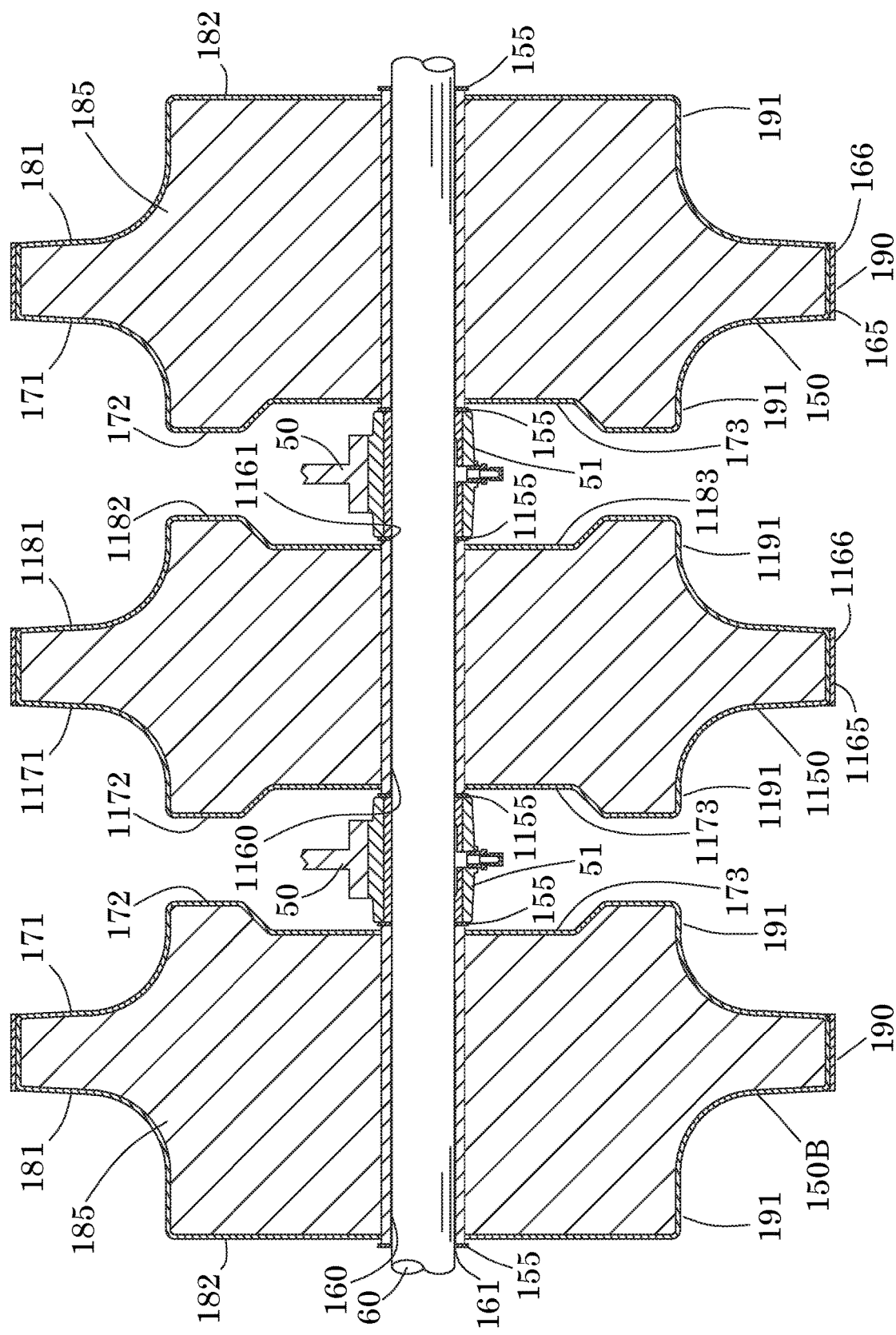
FIG. 13 is a cross-sectional view taken along line 13-13 in FIG. 12.

Turning now to FIGS. 12 and 13, it is seen that an alternative wheel 1150 with a symmetric profile is illustrated. Wheel 1150 has a center 1160 with a hole 1161 there through. The center 1160 has a diameter of sufficient size to encircle shaft 60. The wheel 1150 has an outer perimeter 1165 (or simply, perimeter). A band 1166 is wrapped around the wheel at the outer perimeter. The outer perimeter preferably has a diameter of approximately 32 inches. Of course, it is appreciated that the diameter could be larger or smaller without departing from the broad aspects of the present invention. The band 1166 is preferably a replaceable band that can be made of stainless steel. Yet, other materials could be used without departing from the broad aspects of the present invention. The band 1166 is preferably flush with a first side 1170 and a second side 1180 wherein the band does not have a lip or other protruding portion that could lift forage during operation. Bushings 1155 are provided.

Side 1170 has a radially located outer wall portion 1171 and a radially located inner wall portion 1172 which together define a first side profile. The outer wall portion has a radius or transition that separates or transitions from a vertical segment (perpendicular to the outer band) to a horizontal segment (generally parallel to the outer band). The horizontal segment is approximately 6 inches from the outer band. The outer end of the horizontal segment is about 4 and ¼ inches from the vertical segment. The radius can be alternatively located or have dimensions other that what is shown without departing from the broad aspects of the present invention. The inner wall portion 1172 has a recessed area 1173.

The second side 1180 has a radially located outer wall portion 1181 and a radially located inner wall portion 1182 which together define a second side profile. The outer wall portion has a radius that separates or transitions from a vertical segment (perpendicular to the outer band) to a horizontal segment (generally parallel to the outer band). The horizontal segment is approximately 6 inches from the outer band. The outer end of the horizontal segment is about 4 and ¼ inches from the vertical segment. The radius can be alternatively located or have dimensions other that what is shown without departing from the broad aspects of the present invention. The inner wall portion 1182 has a recessed area 1183.

The first side 1170 and second side 1180 are preferably symmetric.

The wheel 1150 is preferably filled with a heavy substance such as concrete. Yet, other substances could be used without departing from the broad aspects of the present invention. In an alternative embodiment, the wheel could be a solid wheel formed without a center hub.

Wheel 1150 can be placed between two asymmetric wheels (or next to other symmetric wheels). In this regard, an area (formed by recesses of respective wheels) for receiving journals can be located on each side of the symmetric wheel 1150. Further, even though a single wheel 1150 is illustrated, it is understood that the entire forage compactor can be formed with symmetric wheels 1150 without departing from the broad aspects of the present invention.

Turning now to FIGS. 14-25, it is seen that a hitch framework 210 is provided. The framework 210 has a top connector 220 with a first plate 230 with three holes 231, 232 and 233 there through. A second plate 240 with three holes 241, 242 and 243 there through is also provided. The second plate 240 is preferably parallel to the first plate 230.

Two bottom connectors 260 and 300 are provided.

Bottom connector 260 has a first plate 270 with a hole 271 there through, a second plate 280 with an extension plate or extension 281 with a hole 282 there through, and a third plate 290 with a hole 291 there through. Plates 270, 280 and 290 are preferably parallel to each other, are connected to the cross bar 30 and also are supported by the depending bar 65. The extension 281 is preferably removably secured to plate 280 with bolts or other suitable fasteners.

Bottom connector 300 has a first plate 310 with a hole 311 there through, a second plate 320 with an extension plate or extension 321 with a hole 322 there through, and a third plate 330 with a hole 331 there through. Plates 310, 320 and 330 are preferably parallel to each other, are connected to the cross bar 30 and also are supported by the depending bar 65. The extension 321 is preferably removably secured to plate 320 with bolts or other suitable fasteners.

Looking now specifically at FIGS. 14 and 15, it is seen that a first set up is provided for a category 3 hitch. In order to connect to a category 3 hitch, bushings 336 are provided at the within holes 231 and 241 of the top connector so that a pin 335 can be received. Two examples of a bottom set up are provided. In FIG. 15, on the left, a stepped pin 335A can be provided for use when bushings are not used. On the right, an alternative set up is provided utilizing bushings 336A and a longer straight pin 335B.

Figure 16:
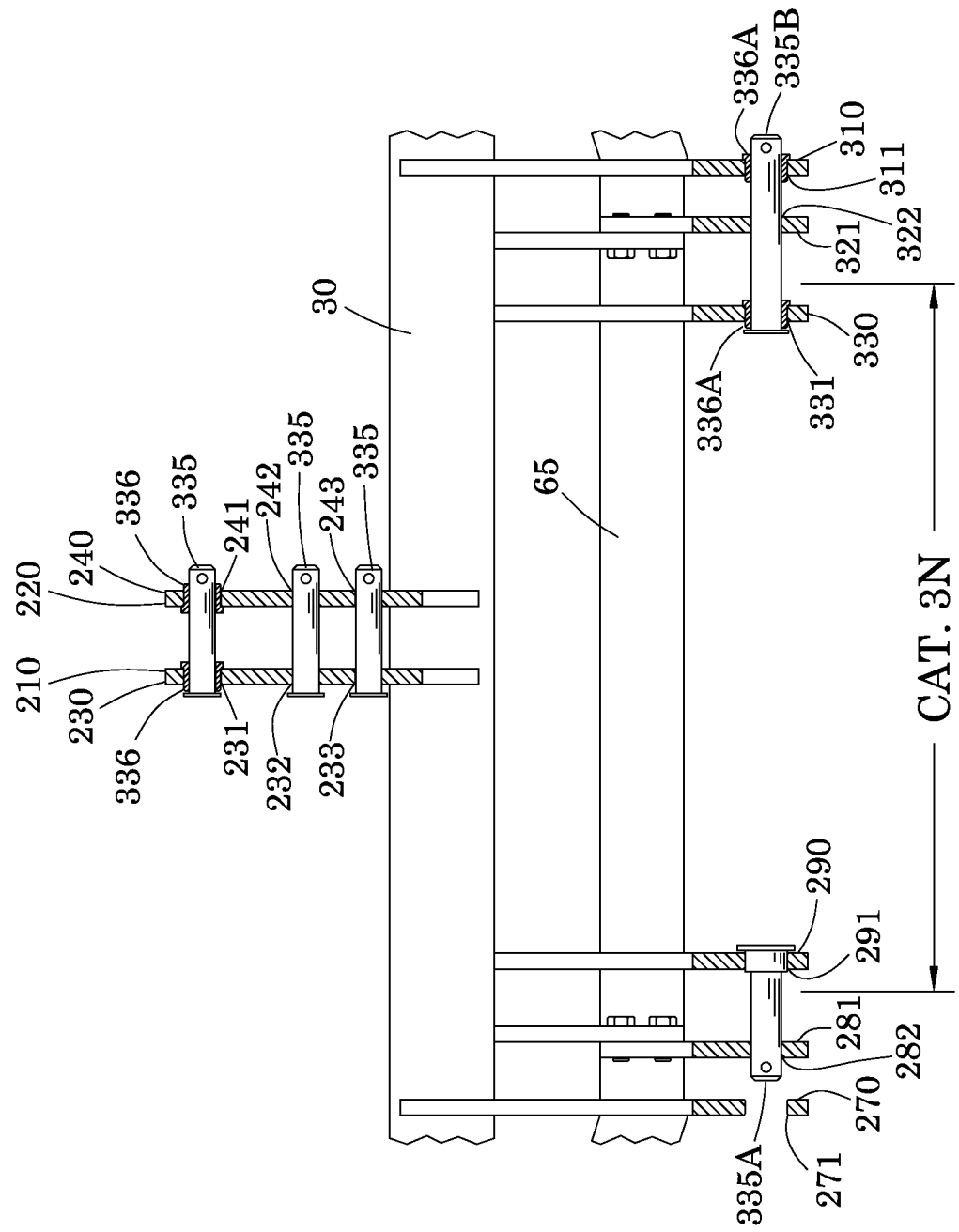
FIG. 16 is similar to FIG. 15, but shows a hitch assembly set up for a category 3N hitch.

Extensions 281 and 321 are turned around relative to plates 280 and 320, respectively, in order modify the framework to be used with a category 3N hitch as seen in FIG. 16. Turning the extension changes the effective spacing between the respective plates thereby allowing the framework to be configured for a given hitch. There are also two alternatives for such a connection using two types of pins. A stepped pin 335A is shown on the left side where bushings are not used, and a straight pin 335B is shown on the right side when bushings are used. It is appreciated that the bushings are flipped so that they can accommodate the pressures of the hitch.

Figure 19:
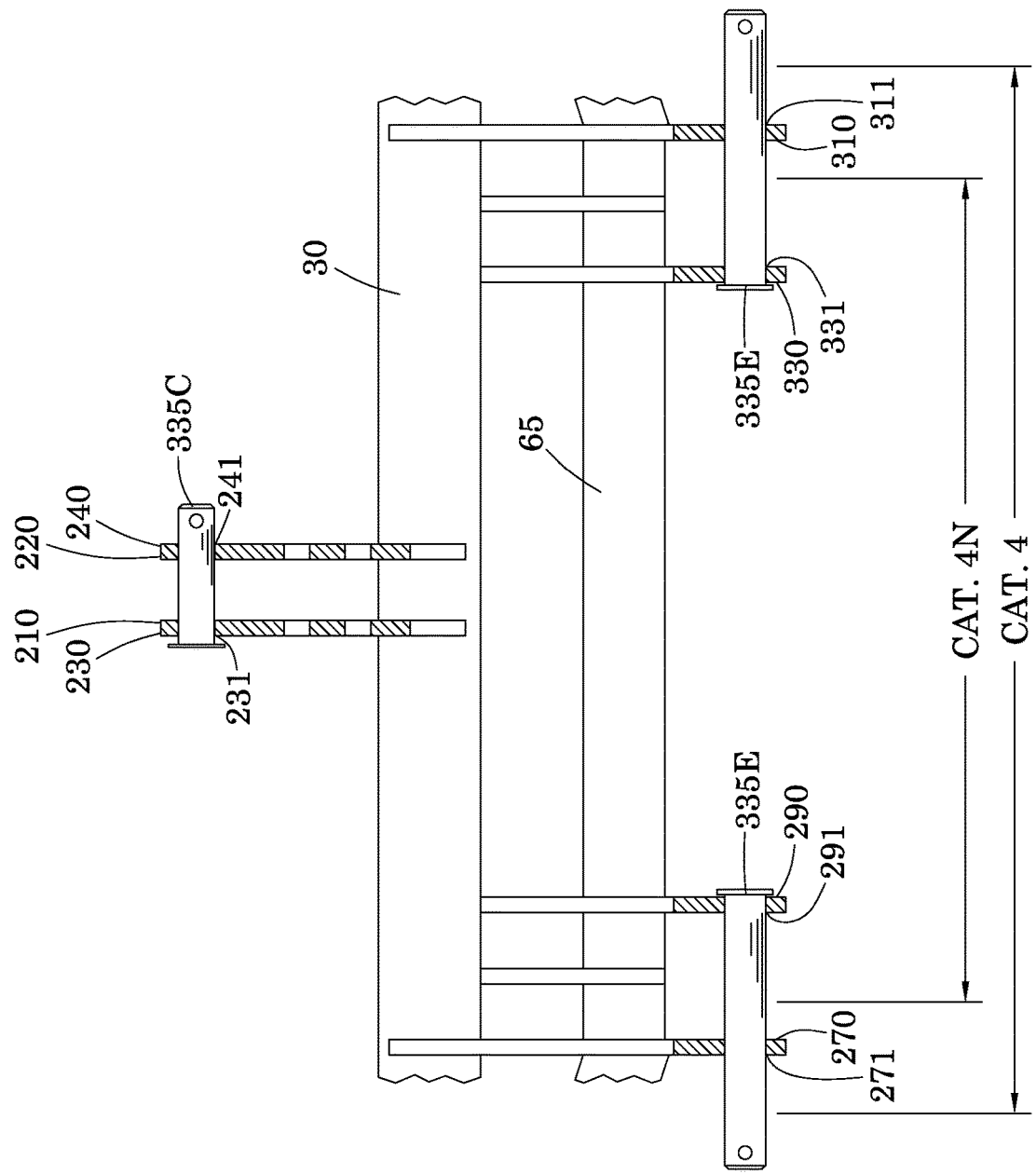
FIG. 19 is similar to FIG. 18 and shows an alternative pin for a hitch framework set up for category 4 and 4N hitches.

Now looking at FIGS. 17-19, it is seen that a first set up is provided for a category 4 and a category 4N hitch. In order to connect to a category 4 hitch, no bushings are provided at the with the top connector so that a pin 335C can connect to the top connector in hole 231 and 241. An example of a bottom setup is illustrated in FIG. 18. On the left, a stepped pin 335D is inserted into connector 260 from the left whereby the step contacts the extension 281 of plate 280 and the reduced area of the pin passes through a bushing 336A in hole 291 of plate 290. A similar pin can be inserted into connector 300 from the right. In this regard, the step of pin 335D contacts the extension 321 of plate 320 and the reduced end of the pin passes through a bushing 336A in hole 331 of plate 330.

Contrasted in FIG. 19 is a further alternative arrangement also setup for category 4 and category 4N. In this regard, no extension is provided on middle plate 280 and a pin 335E passes through the holes 271 and 291 of plates 270 and 290, respectively. Similarly, no extension is provided on middle plate 320 and a pin passes through the holes 311 and 331 or plates 310 and 330, respectively.

The setup of FIG. 19 could be modified by using elongated pins to be setup for a 4N category hitch as well.

It is understood that the spacing of the holes in these embodiments accommodates standard U-frame couplers associated with tractors capable of lifting the compactor of the present invention.

It is appreciated that clips or alternative retainers could be used to secure the pins described above in place. One such retainer 341 is illustrated in FIG. 15. Further, it is appreciated that alternative connectors could be utilized in place of the illustrated pins without departing from the broad aspects of the present invention.

Now looking at FIGS. 20 and 21 it is seen that a framework 210 is provided for a category 3N or category 4 hitch. A stepped pin 335F is provided for use with the top connector 220. Pin 335F has a wide end that can be received within holes 231 and 241. Pin 335F also has a narrow end that can be received within either holes 232 and 242 or holes 233 and 243. Each pin has a flange at the intersection between the narrow and wide ends. The pin has a hole at the remote ends of the pin. The flange has an outer perimeter with a diameter larger than the wide end of the pin whereby it can contact the plate 230 to prevent the pin from passing there through. Fasteners or clips can be used to secure the pin in place.

A second pin 335G is also provided. The pin 335G is also a stepped pin with a wide end and a narrow end. A hole is at each end of the pin. Alternatively, a flange could be at the wide end of the pin. The hole on the narrow side is hole 337. A bushing 336B with a hole 338 there through is also provided. The bushing is also a stepped bushing. A fastener 340 is provided. The bushing can be in a first position wherein hole 338 is aligned with hole 337 and the fastener 340 can be inserted through the respective holes.

Contrasting now in FIGS. 22 and 23, it is seen that plates 281 and 321 can be flipped relative plates 280 and 320 (to change the spacing between the plates and extension), respectively, and the framework is set up for a category 3 hitch. In this regard, pin 335F are provided only for holes 232 and 242 and for holes 233 and 243. Pin 335G is flipped (enters from the center) and the bushing 336B is on the exterior side of the framework.

Figure 24:
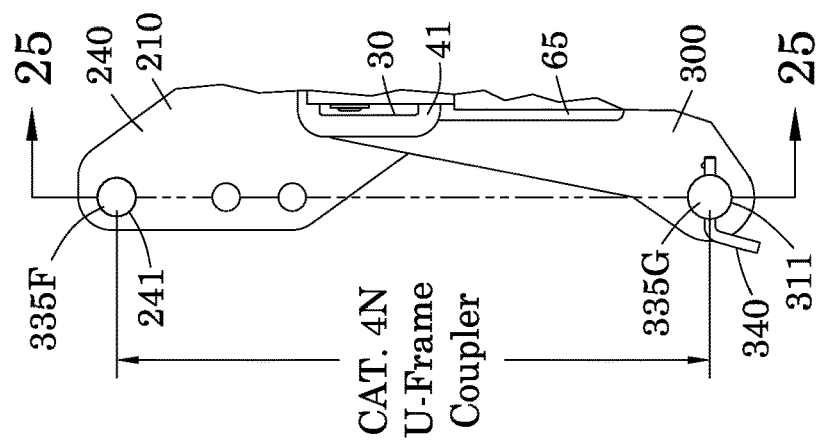
FIG. 24 is a side view of an embodiment of a hitch framework useful for category 4N hitches.
Figure 25:
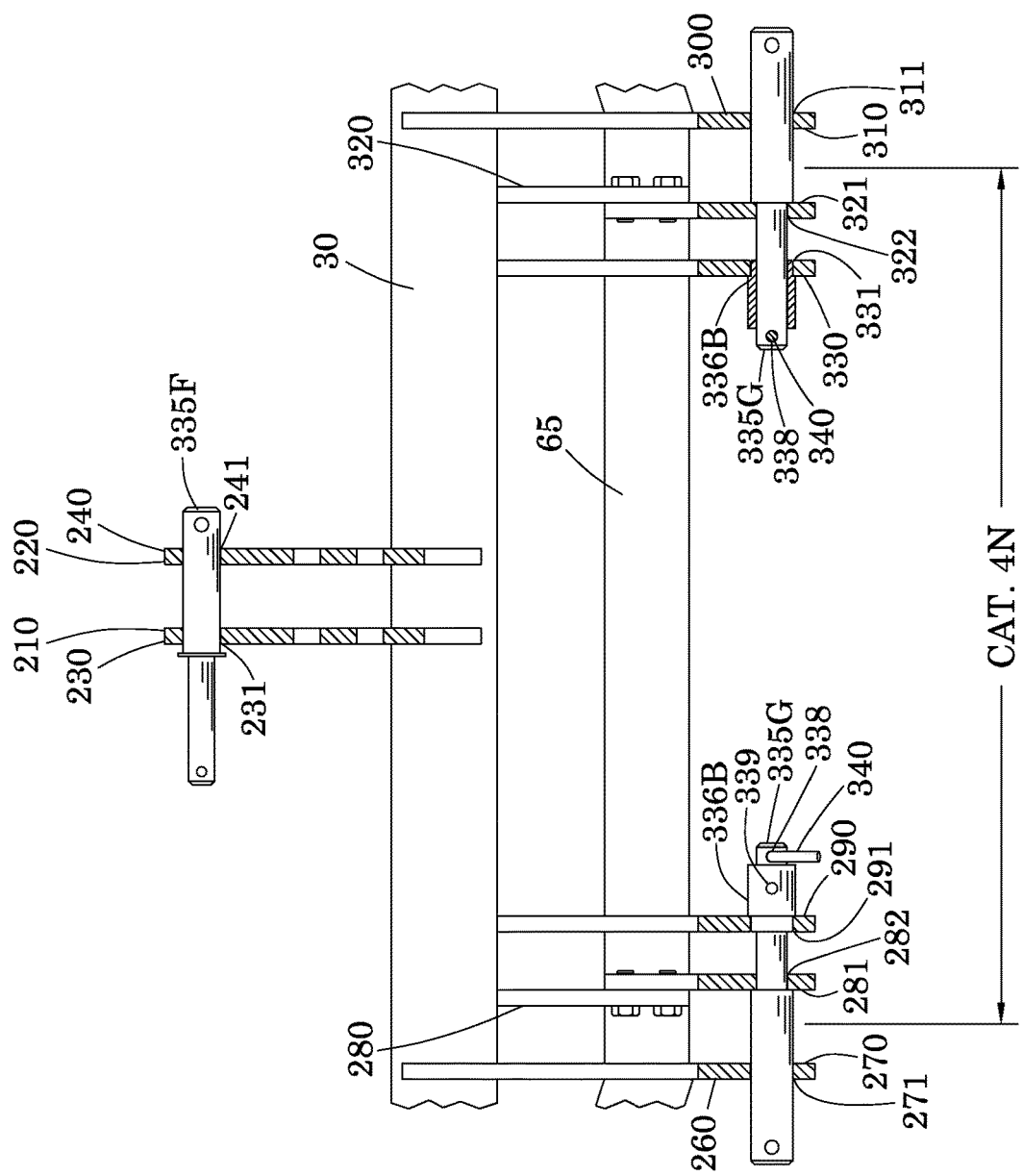
FIG. 25 is a cross-sectional view taken along line 25-25 in FIG. 24.

Contrasting again in FIGS. 24 and 25, it is seen that plate orientation of plates 281 and 321 remains the same. Pin 335G is now inserted from the outside towards the center of the framework. The bushings 336B can be moved inward until they are received in holes 291 and 331. In this regard, fasteners 340 are used to pass only through the pins and lock the bushings at their interior location.

Thus it is apparent that there has been provided, in accordance with the invention, a forage compactor that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A forage compactor comprising:
   a frame;
   a riser connected to said frame;
   a journal connected to said riser;
   a shaft surrounded by said journal; and
   a plurality of wheels oriented along said shaft, said plurality of wheels comprising a first wheel, a second wheel and a third wheel, said first wheel being adjacent to said second wheel and said third wheel being adjacent to said second wheel, wherein:
   said first wheel has a first wheel primary compaction zone with a first wheel primary compaction zone center point, said first wheel further having a first wheel first side and a first wheel second side, said first wheel first side having a first wheel first side outer end separated from said first wheel primary compaction zone center point by a first distance, said first wheel having a first wheel first side outer wall portion and a first wheel first side inner wall portion, said first wheel first side inner wall portion having a first wheel first side outer end face and a first wheel recess with a first wheel recess face;
   said second wheel having a second wheel primary compaction zone with a second wheel primary compaction zone center point, said second wheel further having a second wheel first side and a second wheel second side, said second wheel first side having a second wheel first side outer end that is separated from said second wheel primary compaction zone center point by said first distance, said second wheel second side having a second wheel second side outer end that is separated from said second wheel primary compaction zone center point by a second distance, said second wheel having a second wheel first side outer wall portion and a second wheel first side inner wall portion, said second wheel first side inner wall portion having a second wheel first side outer end face and a second wheel recess with a second wheel recess face; and
   said third wheel has a third wheel primary compaction zone with a third wheel primary compaction zone center point, said third wheel further having a third wheel first side and a third wheel second side, said third wheel second side having a third wheel second side outer end separated from said third wheel primary compaction zone center point by a third distance that is the same as said second distance,
   wherein:
   a first gap is present and spans between said first wheel first side outer end and said second wheel first side outer end;
   a second gap is present and spans between said second wheel second side outer end and said third wheel second side outer end;

said second gap is narrower than said first gap;
a first wheel separation distance is between said first wheel primary compaction zone center point and said second wheel primary compaction zone center point;
a second wheel separation distance is between said second wheel primary compaction zone center point and said third wheel primary compaction zone center point;
said first wheel separation distance is the same as said second wheel separation distance,
said first wheel first side outer end face opposes and is separated from said second wheel first side outer end face by an outer end face distance to provide clearance for said riser;
said first wheel recess face opposes and is separated from said second wheel recess face by a recess face distance to provide clearance for said journal; and
said recess face distance is greater than said outer end face distance.

2. The forage compactor of claim 1 wherein:
said first wheel first side outer wall portion is a first wheel secondary compaction zone;
said second wheel first side outer wall portion has a second wheel first side radius, said second wheel first side outer wall portion being a second wheel secondary compaction zone; and
said second wheel further comprises a second wheel second side outer wall portion and a second wheel second side inner wall portion, said second wheel second side outer wall portion having a second wheel second side radius.

3. The forage compactor of claim 2 wherein said second wheel first side outer wall portion has a vertical section and a horizontal section, said vertical section and said horizontal section being separated by said second wheel first side radius.

4. A forage compactor comprising:
a frame;
a shaft;
a first wheel, said first wheel having a first wheel primary compaction zone and a first wheel secondary compaction zone, said first wheel further having a first wheel first side and a first wheel second side, said first wheel further having a first wheel first side outer wall portion and a first wheel first side inner wall portion, said first wheel first side inner wall portion having a first wheel first side outer end with a first wheel first side outer end face and a first wheel recess with a first wheel recess face, said first wheel first side outer wall portion forming said first wheel secondary compaction zone;
a second wheel, said second wheel having a second wheel primary compaction zone and a second wheel secondary compaction zone, said second wheel further having a second wheel first side and a second wheel second side, said second wheel further having a second wheel first side outer wall portion and a second wheel first side inner wall portion, said second wheel first side inner wall portion having a second wheel first side outer end with a second wheel first side outer end face and a second wheel recess with a second wheel recess face, said second wheel first side outer wall portion forming said second wheel secondary compaction zone, said second wheel being separated from said first wheel by a wheel gap that spans a distance between said first wheel first side outer end face and said second wheel first side outer end face;
a riser connected to said frame and passing through said wheel gap; and
a journal having a journal length, said journal being supported by said riser, said journal supporting said shaft, said journal being located within a journal gap spanning between said first wheel recess face and said second wheel recess face, wherein said wheel gap is smaller than said journal gap,
wherein said first wheel and said second wheel are supported by said shaft.

5. The forage compactor of claim 4 further comprising a third wheel, wherein:
said first wheel has a first wheel band with a first wheel band center point;
said second wheel has a second wheel band with a second wheel band center point;
said third wheel has a third wheel band with a third wheel band center point;
said first wheel is adjacent to said second wheel and said third wheel is adjacent to said second wheel; and
a first distance between said first wheel band center point and said second wheel band center point is the same as a second distance between said second wheel band center point and said third wheel band center point.

6. A forage compactor comprising:
a frame having a frame first end, a frame second end, a frame interior, a frame longitudinal axis oriented between said frame first end and said frame second end, and a lip, said lip lying in a lip plane, said lip plane being located at said frame first end and perpendicular to said frame longitudinal axis;
a shaft connected to said frame, said shaft having a shaft longitudinal axis that is parallel with said frame longitudinal axis;
a plurality of wheels supported by said shaft, said plurality of wheels being rotatable along said shaft longitudinal axis;
a first storage assembly at said frame first end deployable to a deployed position and storable in a storage position within said frame interior, said first storage assembly having a leg, said leg having a head, said head having a recess and a slot; and
a second storage assembly at said frame second end;
wherein:
said leg is rotatable relative to a receiver that is movable within said frame interior;
said recess mates with said lip when said storage assembly is in said deployed position restricting movement of said first storage assembly in two directions parallel to said frame longitudinal axis,
a pin is movable within said slot, said pin rotatably connecting said head to said receiver, movement of said pin within said slot allows said lip and said recess to selectably engage when said leg is moving towards said deployed position and selectably disengage to allow said leg to move from said deployed position; and
said head is movably received within said frame interior along said frame longitudinal axis when said storage assembly is in said storage position.

7. A forage compactor comprising:
a frame having a frame longitudinal axis between a frame first end and a frame second end, a first cross bar, a second cross bar, and at least one key, said first cross bar and said second cross bar being parallel to each other and to said frame longitudinal axis and said at least one key spanning perpendicularly between said first cross bar and said second cross bar;

a shaft connected to said frame, said shaft having a shaft longitudinal axis that is parallel with said frame longitudinal axis;

a plurality of wheels supported by said shaft, said plurality of wheels being rotatable along said shaft longitudinal axis; and at least one weight having a weight first end, a weight second end and an elongated slot laterally across said at least one weight, said elongated slot extending between said first cross bar and said second cross bar, said at least one weight being supported on said frame and being interconnected with said at least one key, said slot mating with said at least one key to prevent said at least one weight from moving along said frame longitudinal axis and said at least one weight is bound laterally relative to said frame by said first cross bar and said second cross bar.

8. The forage compactor of claim 7 wherein said at least one key has a linear profile.

9. The forage compactor of claim 4 further comprising a collar connected to said shaft, wherein one of said first wheel and said second wheel engages said collar upon rotation which further causes said shaft to rotate.

10. The forage compactor of claim 6 wherein:

said leg is a first leg and said first storage assembly further comprises a second leg;

said first leg and said second leg are on opposite sides of said shaft longitudinal axis; and said first leg and said second leg are connected to each other by a cross brace and move in unison.

11. The forage compactor of claim 6 wherein said first storage assembly and said second storage assembly are stored in a colinear relationship.

12. The forage compactor of claim 7 wherein said at least one key that spans fully between said first cross bar and said second cross bar in a fixed position relative to said first cross bar and said second cross bar.

* * * * *